(12) United States Patent
Shin et al.

(10) Patent No.: US 10,254,585 B2
(45) Date of Patent: Apr. 9, 2019

(54) BACKLIGHT UNIT AND DISPLAY DEVICE INCLUDING THE SAME

(71) Applicant: LG ELECTRONICS INC., Seoul (KR)

(72) Inventors: Jongyoung Shin, Seoul (KR); Uihyung Lee, Seoul (KR); Eunseok Kim, Seoul (KR); Juyoung Joung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/416,089

(22) Filed: Jan. 26, 2017

(65) Prior Publication Data

US 2017/0219881 A1    Aug. 3, 2017

(30) Foreign Application Priority Data

Feb. 1, 2016    (KR) .......................... 10-2016-0012105

(51) Int. Cl.
*G02F 1/1335* (2006.01)

(52) U.S. Cl.
CPC .. *G02F 1/133605* (2013.01); *G02F 1/133603* (2013.01); *G02F 1/133608* (2013.01); *G02F 1/133611* (2013.01)

(58) Field of Classification Search
CPC ............................................. G02F 1/133605
See application file for complete search history.

(56) References Cited

U.S. PATENT DOCUMENTS

| 2012/0069248 | A1* | 3/2012 | Yokota | .............. | G02F 1/133605 348/739 |
| 2014/0204578 | A1* | 7/2014 | Kim | .............. | F21V 11/16 362/235 |
| 2014/0211121 | A1* | 7/2014 | Cho | .............. | G02F 1/133603 349/58 |
| 2015/0146436 | A1 | 5/2015 | Heo et al. | | |
| 2015/0331284 | A1 | 11/2015 | Cho et al. | | |
| 2016/0004123 | A1 | 1/2016 | Tanabe | | |
| 2016/0091760 | A1* | 3/2016 | Ogura | .............. | G02F 1/133611 349/69 |

FOREIGN PATENT DOCUMENTS

EP    3 015 913    5/2016
JP    2013-143217    7/2013

OTHER PUBLICATIONS

European Search Report dated May 19, 2017 issued in Application No. 17153974.5.
European Office Action dated Jun. 26, 2018 issued in Application No. 17153974.5.

* cited by examiner

*Primary Examiner* — Alexander K Garlen
(74) *Attorney, Agent, or Firm* — Ked & Associates, LLP

(57) ABSTRACT

A backlight unit and a display device including the backlight unit are disclosed. The backlight unit includes a frame including a bottom area and a side area extended from the bottom area, at least one substrate positioned at a front surface of the frame and mounting a plurality of light sources, a reflective sheet positioned at a front surface of the at least one substrate and including a strip area in at least a portion of the reflective sheet, and an optical sheet positioned at a front surface of the reflective sheet. A reflectance of the at least the portion of the reflective sheet is different from a reflectance of at least another portion of the reflective sheet.

19 Claims, 36 Drawing Sheets

(a)

(b)

(a)

(b)

(a)

(b)

(a)

(b)

(a)

(b)

(a)

(b)

(a)

(b)

(a)

(b)

BACKLIGHT UNIT AND DISPLAY DEVICE INCLUDING THE SAME

CROSS-REFERENCE TO RELATED APPLICATION(S)

This application claims the benefit of Korean Patent Application No. 10-2016-0012105 filed on Feb. 1, 2016, the entire contents of which are incorporated herein by reference for all purposes as if fully set forth herein.

BACKGROUND

1. Field

The present disclosure relates to a backlight unit and a display device including the backlight unit.

2. Background

With the development of the information society, various demands for display devices are increasing. Various display devices, such as liquid crystal displays (LCDs), plasma display panels (PDPs), electroluminescent displays (ELDs), and vacuum fluorescent displays (VFDs), have been recently studied and used in response to various demands for the display devices.

Among the display devices, a liquid crystal display panel of a liquid crystal display includes a liquid crystal layer and a thin film transistor (TFT) substrate and a color filter substrate that are positioned opposite each other with the liquid crystal layer interposed therebetween. The liquid crystal display panel displays an image using light provided by a backlight unit.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
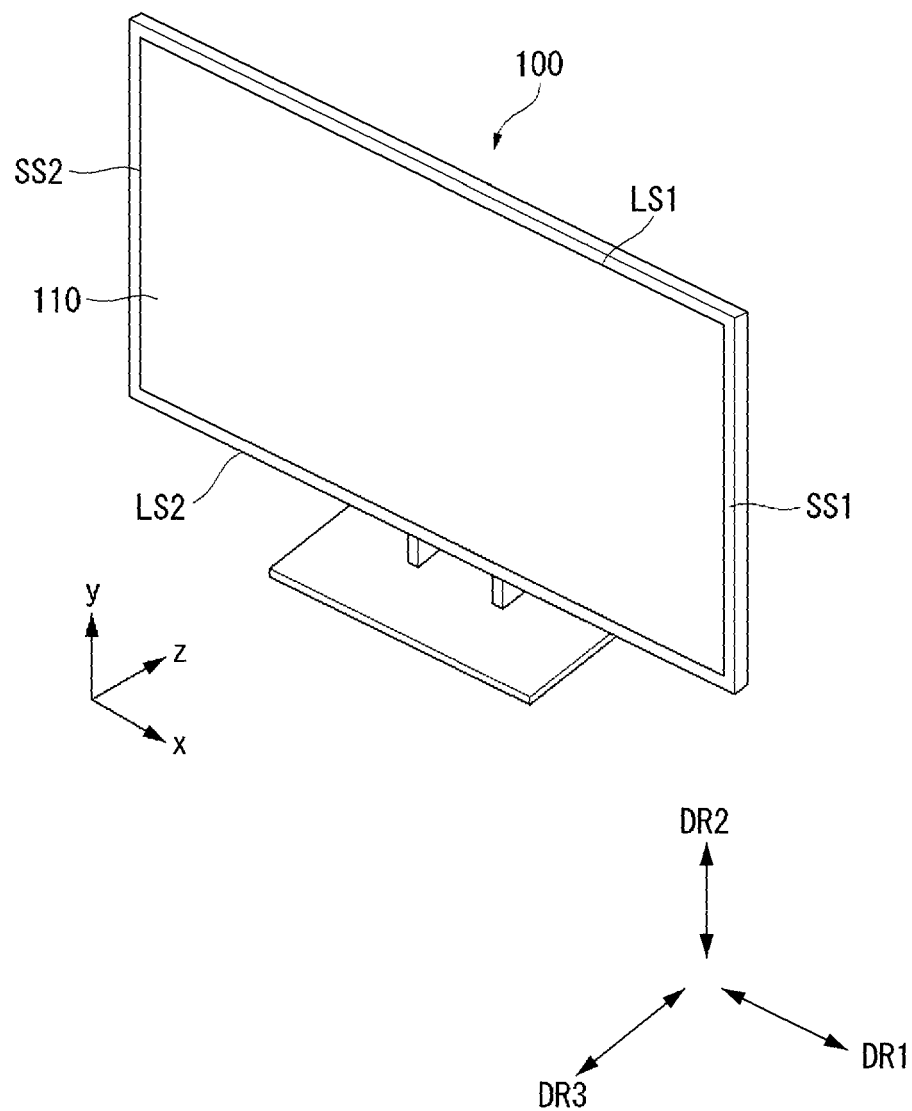
FIGS. 1 and 2 illustrate a display device according to an embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the invention are provided to those skilled in the art in order to describe the present invention more completely. Accordingly, shapes and sizes of elements shown in the drawings may be exaggerated for clarity.

Hereinafter, embodiments of the invention are described using a liquid crystal display panel as an example of a display panel. Other display panels may be used. For example, a plasma display panel (PDP), a field emission display (FED) panel, and an organic light emitting diode (OLE©) display panel may be used.

In what follows, a display panel may include a first long side LS1, a second long side LS2 opposite the first long side LS1, a first short side 331 adjacent to the first long side LS1 and the second long side LS2, and a second short side SS2 opposite the first short side SS1.

In embodiments disclosed herein, the first short side SS1 may be referred to as a first side area; the second short side SS2 may be referred to as a second side area opposite the first side area; the first long side LS1 may be referred to as a third side area that is adjacent to the first side area and the second side area and is positioned between the first side area and the second side area; and the second long side LS2 may be referred to as a fourth side area that is adjacent to the first side area and the second side area, is positioned between the first side area and the second side area, and is opposite to the third side area.

Embodiments of the invention describe and illustrate that lengths of the first and second long sides LS1 and LS2 are longer than lengths of the first and second short sides SS1 and SS2 for the convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display panel, and a second direction DR2 may be a direction parallel to the short sides SS1 and 332 of the display panel.

Further, a third direction DR3 may be a direction vertical to the first direction DR1 and/or the second direction DR2.

In the following description, the first direction DR1 and the second direction DR2 may be commonly referred to as a horizontal direction.

Further, the third direction DR3 may be referred to as a vertical direction.

Figure 2:
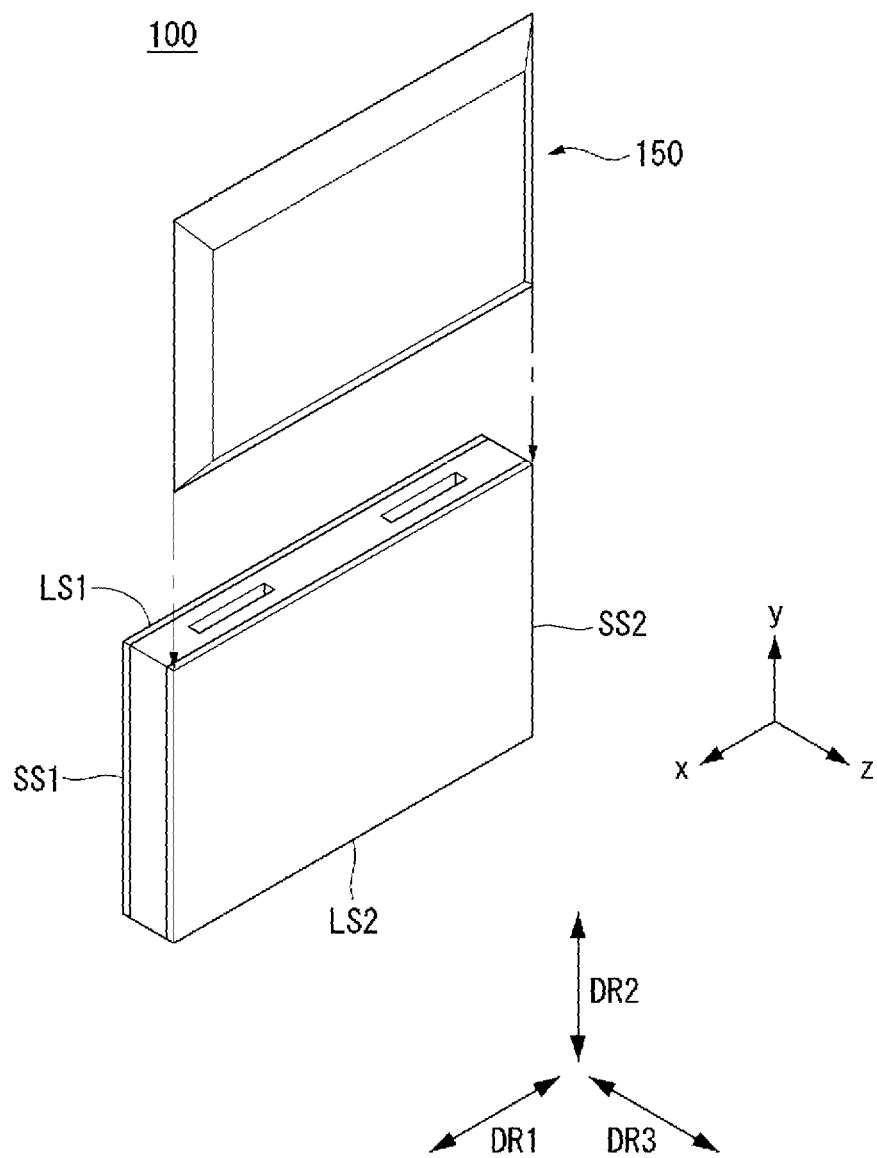

FIGS. 1 and 2 illustrate a display device according to an embodiment of the invention.

As shown in FIGS. 1 and 2, a display device 100 according to an embodiment of the invention may include a display panel 110 and a back cover 150 positioned in the rear of the display panel 110.

The back cover 150 may be connected to the display panel 110 in a sliding manner in a direction (i.e., the second direction DR2) from the first long side LS1 to the second long side LS2. In other words, the back cover 150 may be inserted into the first short side SS1, the second short side SS2 opposite the first short side SS1, and the first long side LS1 that is adjacent to the first and second short sides SS1 and SS2 and is positioned between the first short side SS1 and the second short side SS2, in the display panel 110 in the sliding manner.

The back cover 150 and/or other components adjacent to the back cover 150 may include a protrusion, a sliding portion, a coupling portion, etc., so that the back cover 150 is coupled to the display panel 110 in the sliding manner.

FIGS. 3 to 7 illustrate configuration of the display device related to the embodiment of the invention.

Figure 3:
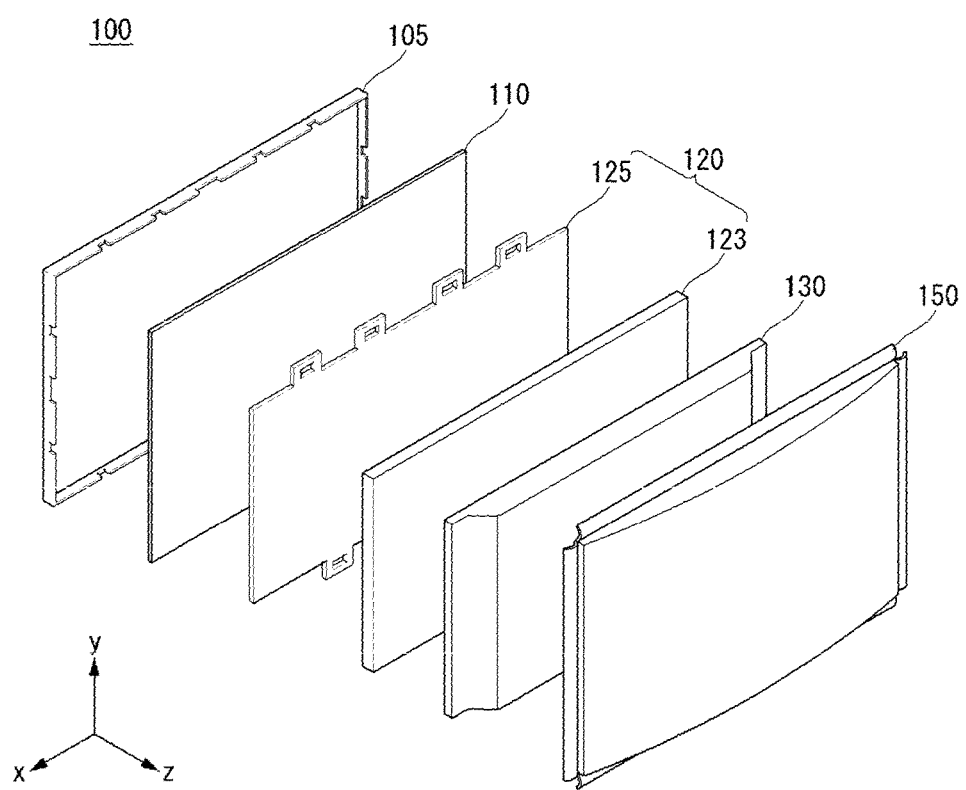
FIGS. 3 to 7 illustrate configuration of a display device related to an embodiment of the invention.

As shown in FIG. 3, the display device 100 according to the embodiment of the invention may include a front cover 105, the display panel 110, a backlight unit 120, a frame 130, and the back cover 150.

The front cover 105 may cover at least a portion of a front surface and a side surface of the display panel 110. The front cover 105 may have a rectangular fame shape, in which a center portion is empty. Because the center portion of the front cover 105 is empty, an image displayed on the display panel 110 may be seen to the outside.

The front cover 105 may include a front cover and a side cover. Namely, the front cover 105 may include the front cover at the front surface of the display panel 110 and the side cover at the side surface of the display panel 110. The front cover and the side cover may be separately configured. One of the front cover and the side cover may be omitted. For example, the front cover may be omitted, and only the side cover may be absent in terms of a beautiful appearance of the display device 100.

The display panel 110 may be positioned in front of the display device 100 and may display an image. The display panel 110 may divide the image into a plurality of pixels and may output the image while controlling color, brightness, and chroma of each pixel. The display panel 110 may include an active area, on which the image is displayed, and an inactive area, on which the image is not displayed. The display panel 110 may include a front substrate and a back substrate that are positioned opposite each other with a liquid crystal layer interposed therebetween.

The front substrate may include a plurality of pixels each including red, green, and blue subpixels. The front substrate may generate an image corresponding to red, green, or blue color in response to a control signal.

The back substrate may include switching elements. The back substrate may turn on pixel electrodes. For example, the pixel electrodes may change a molecule arrangement of the liquid crystal layer in response to a control signal received from the outside. The liquid crystal layer may include a plurality of liquid crystal molecules. The arrangement of the liquid crystal molecules may be changed depending on a voltage difference between the pixel electrode and a common electrode. The liquid crystal layer may transmit light provided by the backlight unit 120 to the front substrate.

The backlight unit 120 may be positioned at a back surface of the display panel 110. The backlight unit 120 may include a plurality of light sources. The light sources of the backlight unit 120 may be arranged in an edge type or a direct type. In case of the edge type backlight unit 120, a light guide plate may be added.

The backlight unit 120 may be coupled to a front surface of the frame 130. For example, the plurality of light sources may be disposed at the front surface of the frame 130. In this instance, the backlight unit 120 may be commonly called the direct type backlight unit 120.

The backlight unit 120 may be driven in an entire driving method or a partial driving method, such as a local dimming method and an impulsive driving method. The backlight unit 120 may include an optical sheet 125 and an optical layer 123.

The optical sheet 125 can cause light of the light sources to be uniformly transferred to the display panel 110. The optical sheet 125 may include a plurality of layers. For example, the optical sheet 125 may include at least one prism sheet and/or at least one diffusion sheet.

The optical sheet 125 may further include at least one coupling portion 125d. The coupling portion 125d may be coupled to the front cover 105 and/or the back cover 150. Namely, the coupling portion 125d may be directly coupled to the front cover 105 and/or the back cover 150. Alternatively, the coupling portion 125d may be coupled to a structure formed at the front cover 105 and/or the back cover 150. Namely, the coupling portion 125d may be indirectly coupled to the front cover 105 and/or the back cover 150.

The optical layer 123 may include the light source, etc. The detailed configuration of the optical layer 123 will be described in the corresponding paragraphs.

The frame 130 may support components constituting the display device 100. For example, the frame 130 may be coupled to the backlight unit 120. The frame 130 may be formed of a metal material, for example, an aluminum alloy.

The back cover 150 may be positioned at a back surface of the display device 100. The back cover 150 may protect inner configuration of the display device 100 from the outside. At least a portion of the back cover 150 may be coupled to the frame 130 and/or the front cover 105. The back cover 150 may be an injection production (or injection molded) formed of a resin material.

Figure 4:
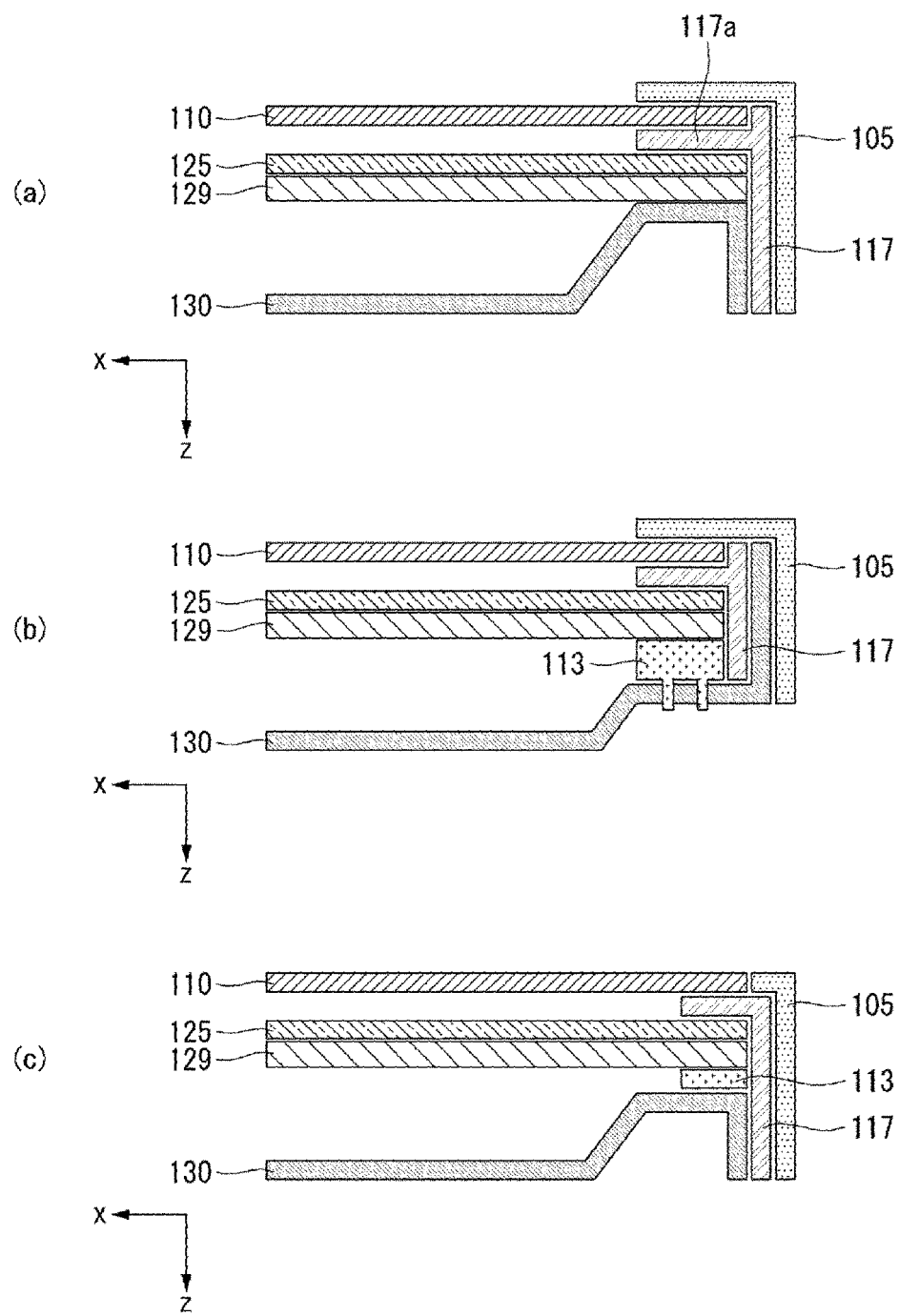

FIG. 4 illustrates configuration of the optical sheet 125.

As shown in (a) of FIG. 4, the optical sheet 125 and/or a diffusion plate 129 may be positioned on the frame 130. The optical sheet 125 and/or the diffusion plate 129 may be coupled to the frame 130 at an edge of the frame 130. The optical sheet 125 and/or the diffusion plate 129 may be directly placed at the edge of the frame 130. Namely, an outer perimeter of the optical sheet 125 and/or the diffusion plate 129 may be supported by the frame 130. An upper surface of an edge of the optical sheet 125 and/or the diffusion plate 129 may be surrounded by a first guide panel 117. For example, the optical sheet 125 and/or the diffusion plate 129 may be positioned between the edge of the frame 130 and a flange 117a of the first guide panel 117.

The display panel 110 may be positioned at a front surface of the optical sheet 125. An edge of the display panel 110 may be coupled to the first guide panel 117. Namely, the display panel 110 may be supported by the first guide panel 117.

An edge area of the front surface of the display panel 110 may be surrounded by the front cover 105. For example, the display panel 110 may be positioned between the first guide panel 117 and the front cover 105.

As shown in (b) of FIG. 4, the display device 100 according to the embodiment of the invention may further include a second guide panel 113. The optical sheet 125 and/or the diffusion plate 129 may be coupled to the second guide panel 113. Namely, the second guide panel 113 may have a shape, in which the second guide panel 113 is coupled to the frame 130, and the optical sheet 125 and/or the diffusion plate 129 are/is coupled to the second guide panel 113. The second guide panel 113 may be formed of a material different from the frame 130. The frame 130 may have a shape surrounding the first and second guide panels 117 and 113.

As shown in (c) of FIG. 4, in the display device 100 according to the embodiment of the invention, the front cover 105 may not cover the front surface of the display panel 110. Namely, one end of the front cover 105 may be positioned on the side of the display panel 110.

Figure 5:
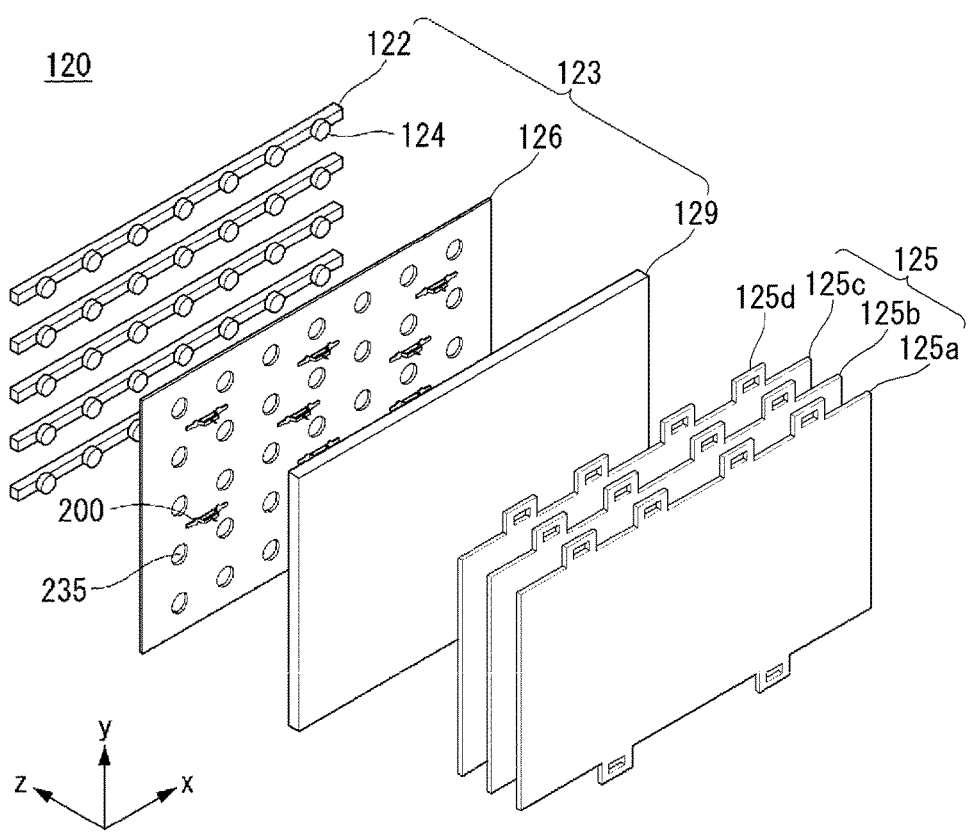
Figure 6:
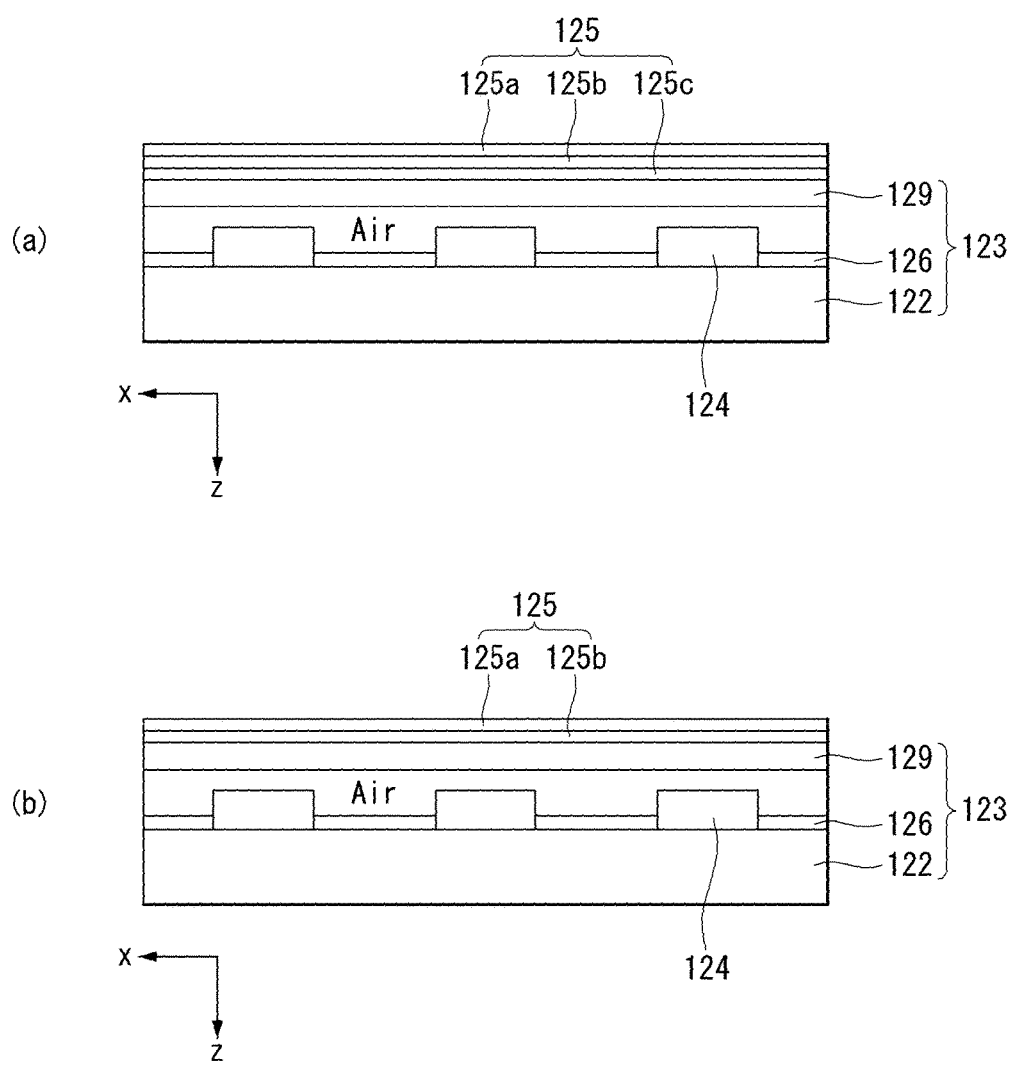

Referring to FIGS. 5 and 6, the backlight unit 120 may include the optical layer 123 including substrates 122, at least one light assembly 124, a reflective sheet 126 and the diffusion plate 129, and the optical sheet 125 positioned on a front surface of the optical layer 123.

The substrates 122 may be configured in a plurality of straps, which are extended in a first direction and are spaced apart from one another by a predetermined distance in a second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB), on which at least one light assembly 124 is mounted.

The light assemblies 124 may be disposed on the substrate 122 at predetermined intervals in the first direction. A diameter of the light assembly 124 may be greater than a width of the substrate 122. Namely, the diameter of the light assembly 124 may be greater than a second direction length of the substrate 122.

The light assembly 124 may be one of a light emitting diode (LED) chip and a LED package having at least one LED chip.

The light assembly 124 may be configured as a colored LED emitting at least one of red, green, and blue light or a white LED. The colored LED may include at least one of a red LED, a green LED, and a blue LED.

The light source included in the light assembly 124 may be a COB (chip-on board) type. The COB light source may be configured such that the LED chip as the light source is directly coupled to the substrate 122. Thus, a manufacturing process may be simplified. Further, a resistance may be reduced, and thus a loss of energy resulting from heat may be reduced. Namely, power efficiency of the light assembly 124 may increase. The COB light source can provide the brighter lighting and may be implemented to be thinner and lighter than a related art.

The reflective sheet 126 may be positioned at the front surface of the substrate 122. The reflective sheet 126 may be positioned in an area excluding a formation area of the light assemblies 124 of the substrates 122. Namely, the reflective sheet 126 may have a plurality of lens holes 235.

The reflective sheet 126 may reflect light emitted from the light assembly 124 to a front surface of the reflective sheet 126. Further, the reflective sheet 126 may again reflect light reflected from the diffusion plate 129.

The reflective sheet 126 may include at least one of metal and metal oxide, each of which is a reflection material. The reflective sheet 126 may include metal and/or metal oxide having a high reflectance, for example, aluminum (Al), silver (Ag), gold (Au), and titanium dioxide ($TiO_2$).

The reflective sheet 126 may be formed by depositing and/or coating the metal or the metal oxide on the substrate 122. An ink including the metal material may be printed on the reflective sheet 126. A deposition layer may be formed on the reflective sheet 126 using a thermal deposition method, an evaporation method, or a vacuum deposition method such as a sputtering method. A coating layer and/or a printing layer may be formed on the reflective sheet 126 using a printing method, a gravure coating method or a silk screen method.

An air gap may be positioned between the reflective sheet 126 and the diffusion plate 129. The air gap may serve as a buffer capable of widely spreading light emitted from the light assembly 124. A supporter (or support plate) 200 may be positioned between the reflective sheet 126 and the diffusion plate 129, so as to maintain the air gap.

A resin may be deposited on the light assembly 124 and/or the reflective sheet 126. The resin may function to diffuse light emitted from the light assembly 124.

The diffusion plate 129 may upwardly diffuse light emitted from the light assembly 124.

The optical sheet 125 may be positioned at a front surface of the diffusion plate 129. A back surface of the optical sheet 125 may be adhered to the diffusion plate 129, and a front surface of the optical sheet 125 may be adhered to the back surface of the display panel 110.

The optical sheet 125 may include at least one sheet. More specifically, the optical sheet 125 may include one or more prism sheets and/or one or more diffusion sheets. The plurality of sheets included in the optical sheet 125 may be attached and/or adhered to one another.

In other words, the optical sheet 125 may include a plurality of sheets having different functions. For example, the optical sheet 125 may include first to third optical sheets 125a to 125c. The first optical sheet 125a may function as a diffusion sheet, and the second and third optical sheets 125b and 125c may function as a prism sheet. The number and/or a position of the diffusion sheet and the prism sheets may be changed. For example, the optical sheet 125 may include the first optical sheet 125a as the diffusion sheet and the second optical sheet 125b as the prism sheet.

The diffusion sheet may prevent light coming from the diffusion plate from being partially concentrated and may homogenize a luminance of the light. The prism sheet may concentrate light coming from the diffusion sheet and may make the concentrated light be vertically incident on the display panel 110.

The coupling portion 125d may be formed on at least one of edges of the optical sheet 125. The coupling portion 125d may be formed on at least one of the first to third optical sheets 125a to 125c.

The coupling portion 125d may be formed at an edge of the long side of the optical sheet 125. The coupling portion 125d on the first long side and the coupling portion 125d on the second long side may be asymmetrical to each other. For example, the number and/or a position of the coupling portions 125d on the first long side may be different from the number and/or a position of the coupling portions 125d on the second long side.

Figure 7:
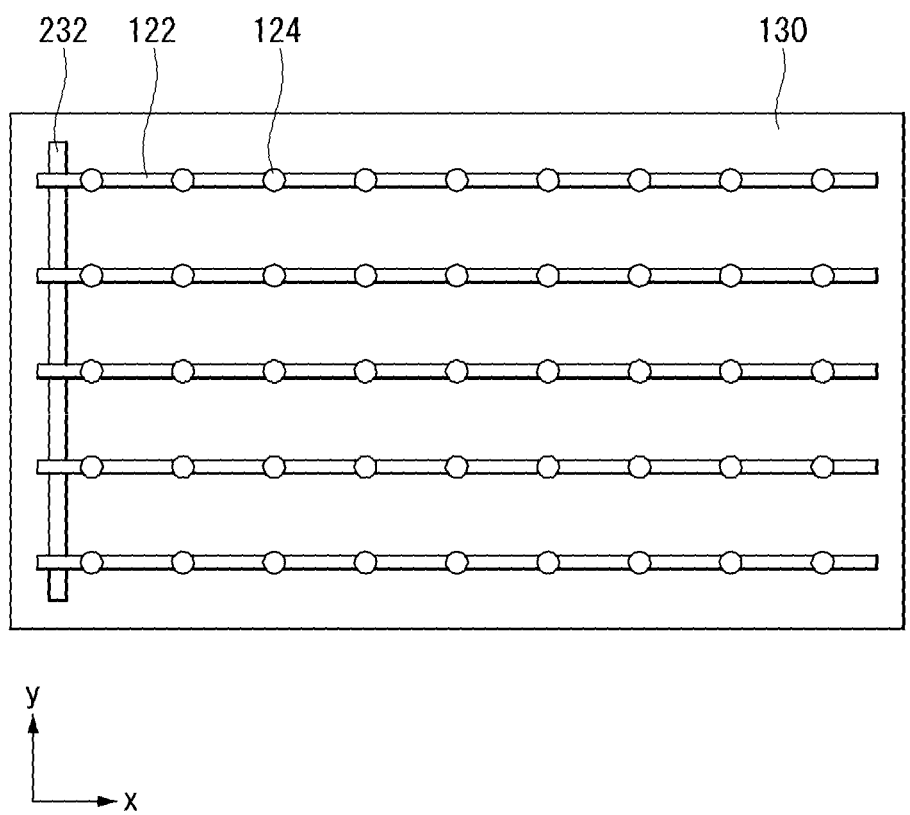

Referring to FIG. 7, the substrates 122 including the plurality of straps, which is extended in the first direction and are spaced apart from one another by a predetermined distance in the second direction perpendicular to the first direction, may be provided on the frame 130. One end of each of the plurality of substrates 122 may be connected to a line electrode 232.

The line electrode 232 may be extended in the second direction. The line electrode 232 may be connected to the ends of the substrates 122 at predetermined intervals in the second direction. The substrates 122 may be electrically connected to the adaptor through the line electrode 232.

The light assemblies 124 may be mounted on the substrate 122 at predetermined intervals in the first direction. A diameter of the light assembly 124 may be greater than a width of the substrate 122 in the second direction. Hence, an outer area of the light assembly 124 may be positioned beyond a formation area of the substrate 122.

Figure 8:
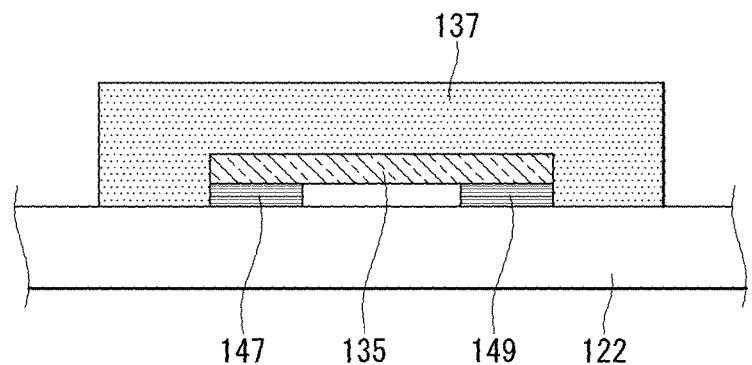
FIGS. 8 and 9 illustrate a light source according to an embodiment of the invention.
Figure 9:
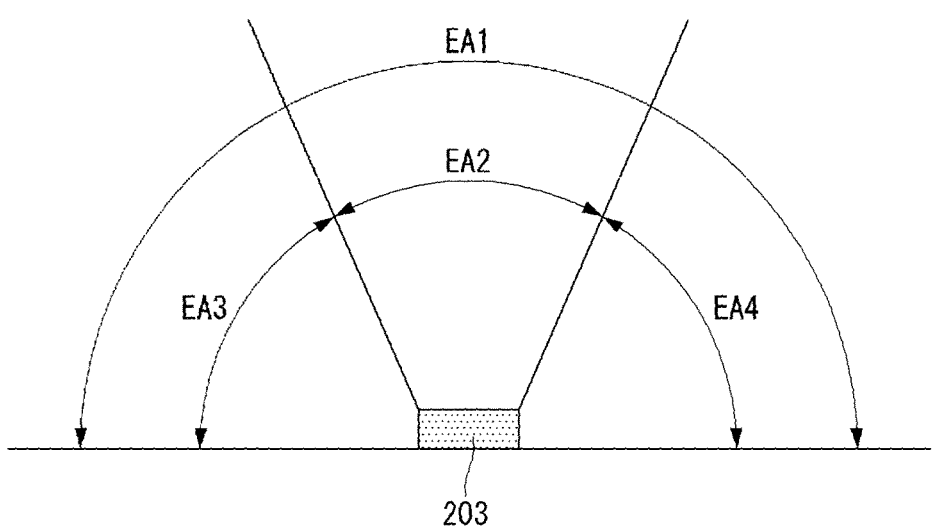

FIGS. 8 and 9 illustrate a light source according to the embodiment of the invention.

As shown in FIG. 8, a light source 203 may be a COB light source. The COB light source 203 may include at least one of an emission layer 135, first and second electrodes 147 and 149, and a fluorescent layer 137.

The emission layer 135 may be positioned on the substrate 122. The emission layer 135 may emit one of red, green, and blue light. The emission layer 135 may include one of Firpic, (CF3ppy)2Ir(pic), 9,10-di(2-naphthyl)anthracene(AND); perylene, distyrybiphenyl, PVK, OXD-7, UGH-3(Blue), and a combination thereof.

The first and second electrodes 147 and 149 may be positioned on both sides of a lower surface of the emission layer 135. The first and second electrodes 147 and 149 may transmit an external driving signal to the emission layer 135.

The fluorescent layer 137 may cover the emission layer 135 and the first and second electrodes 147 and 149. The fluorescent layer 137 may include a fluorescent material converting light of a spectrum generated from the emission layer 135 into white light. A thickness of the emission layer 135 at an upper side of on the fluorescent layer 137 may be uniform. The fluorescent layer 137 may have a refractive index of 1.4 to 2.0.

The COB light source 203 according to the embodiment of the invention may be directly mounted on the substrate 122. Thus, the size of the light assembly 124 may decrease.

Because heat dissipation of the light sources 203 is excellent by forming the light sources 203 on the substrate 122, the light sources 203 may be driven at a high current. Hence, the number of light sources 203 required to secure the same light quantity may decrease.

Further, because the light sources 203 are mounted on the substrate 122, a wire bonding process may not be necessary. Hence, the manufacturing cost may be reduced due to the simplification of the manufacturing process.

As shown in FIG. 9, the light source 203 according to the embodiment of the invention may emit light in a first emission range EA1. Namely, the light source 203 may emit light in an area including a second emission range EA2 of the front side and third and fourth emission ranges EA3 and EA4 of both sides. Thus, the light source 203 according to the embodiment of the invention is different from a related art POB light source emitting light in the second emission range EA2. In other words, the light source 203 according to the embodiment of the invention may be the COB light source, and the COB light source 203 may emit light in a wide emission range including the side.

Because the COB light source 203 emits light even in a direction corresponding to the third and fourth emission ranges EA3 and EA4 of the side, the embodiment of the invention needs to efficiently control light of the side direction. The reflective sheet according to the embodiment of the invention may control a reflectance of light emitted from the light source 203 in the side direction. Thus, the embodiment of the invention may reduce the non-uniformity of brightness resulting from light of the side direction.

Figure 10:
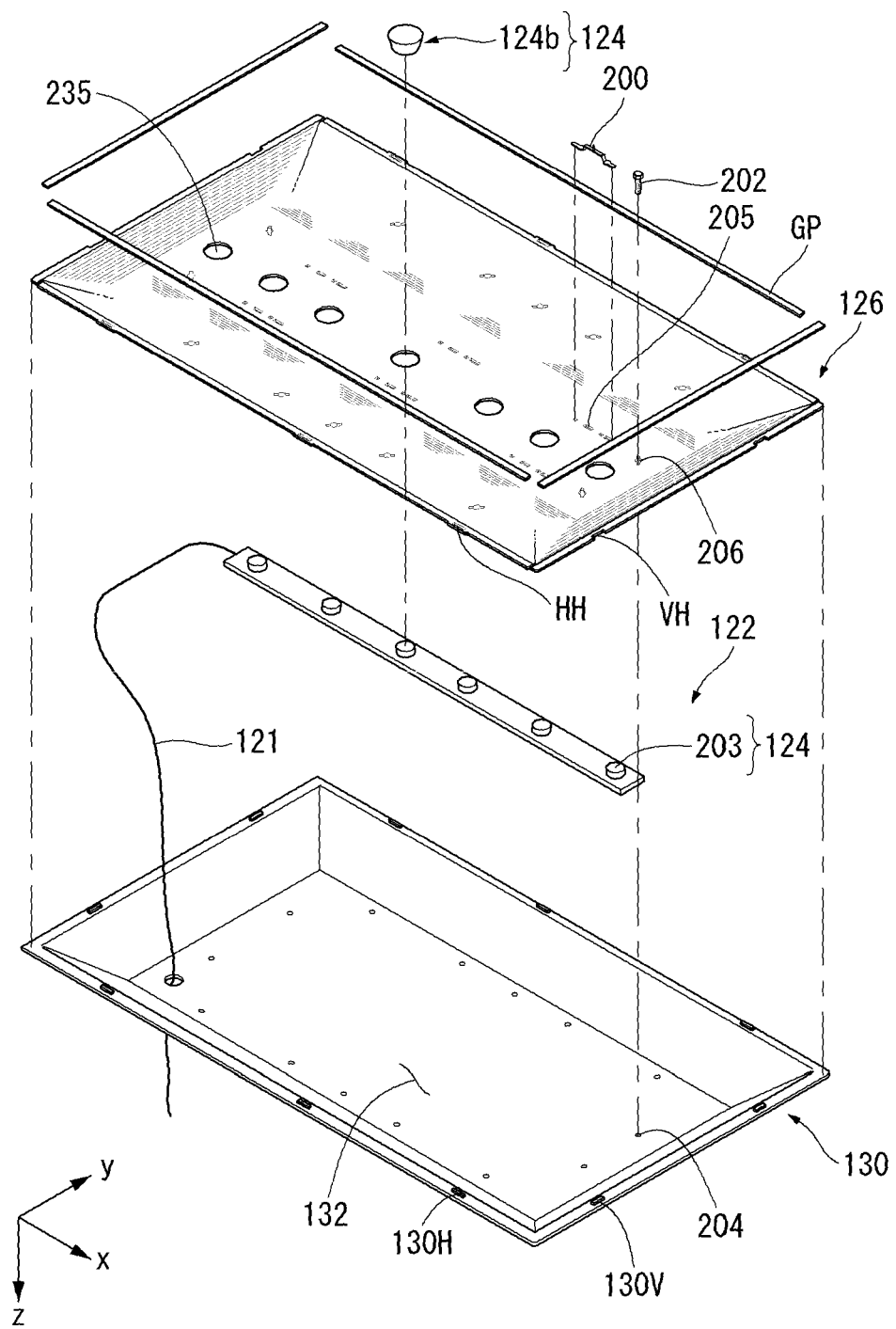
FIG. 10 illustrates a coupling relationship between a reflective sheet and periphery components of the reflective sheet according to an embodiment of the invention.

FIG. 10 illustrates a coupling relationship between a reflective sheet and periphery components of the reflective sheet according to the embodiment of the invention.

As shown in FIG. 10, the reflective sheet 126 according to the embodiment of the invention may be placed on the frame 130. For example, the reflective sheet 126 may be coupled to a receiving portion 132 formed inside the frame 130. The receiving portion 132 may be referred as a recess 132 or a cavity 132. The recess or cavity 132 may be formed on the front surface of the frame 130.

The reflective sheet 126 may include a horizontal coupling portion HH and/or a vertical coupling portion VH. For example, coupling holes may be formed along a long side and/or a short side of the reflective sheet 126.

The horizontal coupling portion HH and/or the vertical coupling portion VH may be inserted into a horizontal protrusion 130H and/or a vertical protrusion 130V formed on the frame 130. A guide panel GP may be formed on the reflective sheet 126.

The guide panel GP may be formed of a plastic material of injection molding or a metal material that is press-processed. The guide panel GP may be coupled to the horizontal protrusion 130H and/or the vertical protrusion 130V. When the guide panel GP is coupled to the reflective sheet 126, the reflective sheet 126 may be fixed between the frame 30 and the guide panel GP. FIG. 10 illustrates that the long sides and the short sides of the guide panel GP are separated from one another, by way of example. The guide panel GP may be configured such that the long sides and the short sides are connected to one another.

The reflective sheet 126 placed on the frame 130 may be configured as a three-dimensional shape corresponding to a shape of the receiving portion 132. Even when the reflective sheet 126 according to the embodiment of the invention has the three-dimensional shape, the reflective sheet 126 can provide an optimum reflection effect. For example, the reflective sheet 126 can uniformly reflect light throughout its entire area.

The reflective sheet 126 may constitute a portion of the backlight unit 120 (see FIG. 5). The substrate 122, on which the light sources 203 are mounted, may be positioned between the reflective sheet 126 and the frame 130.

The plurality of substrates 122 may be arranged in the horizontal direction and/or the vertical direction. The substrates 122 may be connected to signal lines 121 connected to a controller, etc., of the display device 100. The signal lines 121 may be connected to the substrates 122 through holes formed in the frame 130.

The reflective sheet 126 may include a plurality of lens holes 235. The plurality of lens holes 235 may correspond to the light sources 203 on the substrate 122. For example, the plurality of lens holes 235 may be arranged in the horizontal direction and/or the vertical direction correspondingly to the light sources 203. A lens 124b may be inserted into the lens hole 235. For example, the lens 124b may be coupled to the light source 203 through the lens hole 235.

The reflective sheet 126 may include a plurality of support holes (or support plate holes) 205. A supporter 200 may be coupled to the support hole 205. The supporter 200 may support the optical sheet 125 and/or the diffusion plate 129 positioned in front of the reflective sheet 126. Namely, the reflective sheet 126 may be spaced apart from the optical sheet 125 and/or the diffusion plate 129 by a predetermined distance.

The reflective sheet 126 may include a plurality of fixing pin holes 206. A fixing pin 202 may be coupled to the fixing pin hole 206. Also, the fixing pin 202 may be coupled to a frame hole 204 formed in the frame 130. Thus, the fixing pin 202 may fix the reflective sheet 126 to the frame 130.

Figure 11:
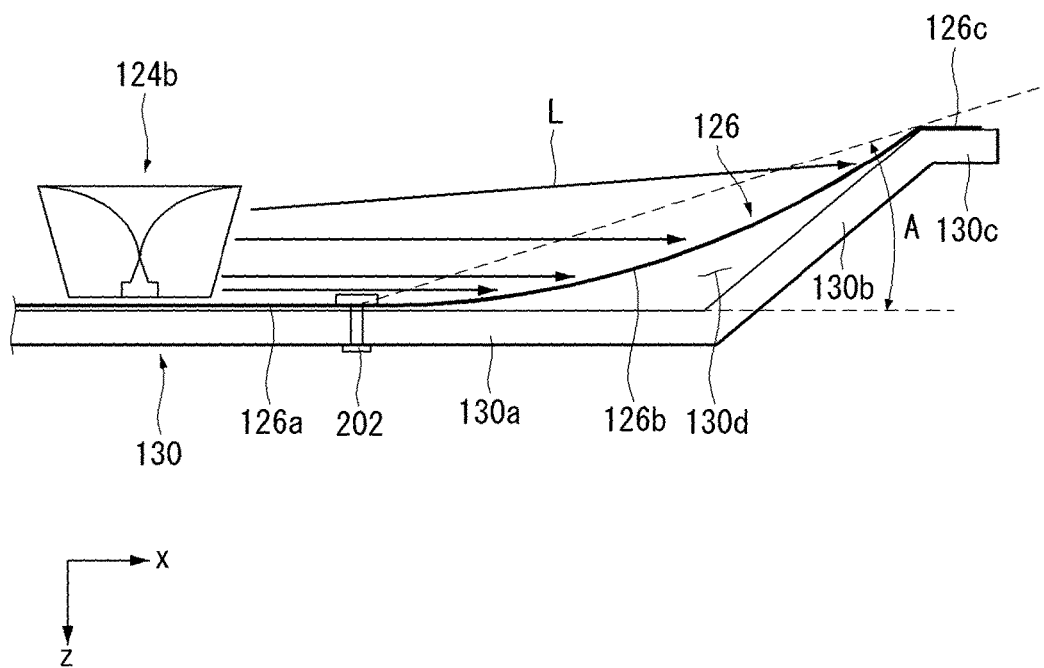
FIGS. 11 and 12 illustrate configuration of a reflective sheet according to an embodiment of the invention.
Figure 12:
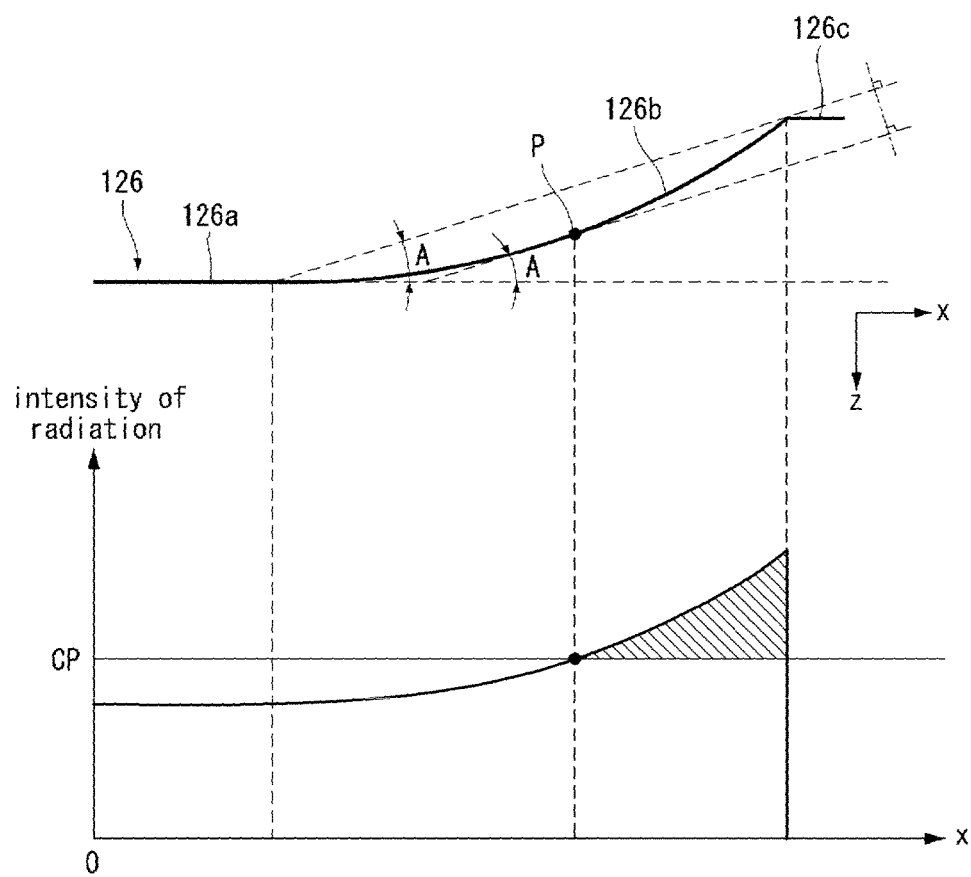

FIGS. 11 and 12 illustrate configuration of the reflective sheet according to the embodiment of the invention.

As shown in FIGS. 11 and 12, the reflective sheet 126 according to the embodiment of the invention may be placed in an inner area of the frame 130. The reflective sheet 126 placed on the frame 130 may have the three-dimensional shape corresponding to a shape of the frame 130.

As shown in FIG. 11, the frame 130 may include first to third frame areas 130a to 130c.

The first frame area 130a may be a bottom surface of the frame 130. The second frame area 130b may be substantially flat. Namely, the second frame area 130b may be a surface positioned on an X-Y plane of the display device 100.

The second frame area 130b may be a sidewall surface extended upwardly from the first frame area 130a. The second frame area 130b may be extended in a direction parallel to a z-axis direction or a direction inclined to the z-axis direction. The receiving portion 132 (see FIG. 10) may be formed inside the frame 130 by the second frame area 130b serving as a sidewall of the frame 130.

The third frame area 130c may be a surface extended from the second frame area 130b in an x-axis direction. The third frame area 130c may be substantially parallel to the first frame area 130a. Namely, the third frame area 130c may be a flat surface in the same manner as the first frame area 130a although it is at a height level different from the first frame area 130a by the second frame area 130b.

The third frame area 130c may include a protruding area. The third frame area 130c may be coupled to a protrusion formed through a separate process. The protruding area and/or the protrusion of the third frame area 130c may be coupled to the reflective sheet 126. For example, the protruding area and/or the protrusion of the third frame area 130c may be coupled to a third sheet area 126c of the reflective sheet 126. The protruding area and/or the protrusion of the third frame area 130c may be coupled to the optical sheet 125 (see FIG. 5).

The reflective sheet 126 may be coupled to an area formed by the first to third frame areas 130a to 130c of the frame 130. For example, the reflective sheet 126 may be coupled to the first frame area 130a through the fixing pin 202. When a portion of the reflective sheet 126 is coupled to the first frame area 130a through the fixing pin 202, the portion of the reflective sheet 126 may naturally contact the frame 130.

When the reflective sheet 126 is coupled to the frame 130 through the fixing pin 202, the shape of the reflective sheet 126 may be naturally changed depending on the shape of the frame 130. Namely, a naturally rounded second sheet area 126b of the reflective sheet 126 may be formed. Thus, a separate process for forming a chamfer of the reflective sheet 126 may not be necessary, and workability may be improved.

The reflective sheet 126 may include first to third sheet areas 126a to 126c. Namely, an area of the reflective sheet 126 may be divided depending on whether or not the reflective sheet 126 and the frame 130 contact each other. For example, the area of the reflective sheet 126 may be divided into a contact area contacting the frame 130 and a non-contact area not contacting the frame 130.

The area of the reflective sheet 126 may be divided or delineated into the first sheet area 126a and the second sheet area 126b by the fixing pin 202. In other words, the second sheet area 126b may be an area between the fixing pin 202 and a portion contacting the third frame area 130c. Namely, the first sheet area 126a and the second sheet area 126b may be determined depending on whether or not the reflective sheet 126 contacts the first frame area 130a of the frame 130.

The second sheet area 126b may be naturally spaced apart from the frame 130 by properties and elasticity of the reflective sheet 126. For example, when the first sheet area 126a is coupled to the frame 130 by the fixing pin 202, the second sheet area 126b may naturally form a curved surface by its own weight and may be spaced apart from the frame 130. A separation space 130d may be formed between the second sheet area 126b and the frame 130. An angle formed by the second sheet area 126b of the reflective sheet 126 and the bottom surface of the frame 130 may gradually increase. Namely, in the non-contact area of the reflective sheet 126, the reflective sheet 126 may have a two-dimensional curve shape. Thus, the second sheet area 126b may be spaced apart from the frame 130 at a predetermined angle.

The third sheet area 126c may be placed in the third frame area 130c. The third sheet area 126c may be coupled to the third frame area 130c. Alternatively, the third sheet area 126c may be naturally positioned on the third frame area 130c. Namely, the third sheet area 126c may contact the third frame area 130c by an elastic force of the z-axis direction resulting from the rounded second sheet area 126b.

Light L may be emitted through the lens 124b. Namely, light generated in the light source 203 may be emitted to the outside through the lens 124b. The light L emitted through the lens 124b may travel through various paths. For example, a portion of the light L may travel through a path of the side direction of the lens 124b.

The portion of the light L on the path of the side direction may travel toward the second sheet area 126b. At least a portion of light generated in the light source 203 may be totally reflected to the inside of the lens 124b and may travel toward the second sheet area 126b. In this instance, an amount of light L upwardly travelling to the second sheet area 126b may be more than an amount of light L downwardly travelling to the second sheet area 126b. In other words, an amount and/or a density of light L transferred to the reflective sheet 126 may be non-uniform. When the amount and/or the density of the light L is not uniform, a viewer watching the display device 100 may perceive non-uniformity of the amount and/or the density of the light L. For example, when an amount of light L incident on an upper portion of the second sheet area 126b is more than an amount of light L incident on a lower portion of the second sheet area 126b, a corresponding area may be recognized as being brighter than other areas because of the light L reflected from the upper portion of the second sheet area 126b.

As shown in FIG. 12, an angle formed by an extension line from a boundary between the first sheet area 126a and the second sheet area 126b to a boundary between the second sheet area 126b and the third sheet area 126c and a straight line parallel to the x-axis direction may be called "A". An inclined angle of the second sheet area 126b may increase from an intersection point P (as a starting point) between the second sheet area 126b and a straight line of the angle A. Namely, an angle of the second sheet area 126b with respect to the x-axis while passing the intersection point P may sharply increase.

Because the angle of the second sheet area 126b while passing the intersection point P increases, a density of the light L emitted from the lens 124b (see FIG. 11) per unit area may further increase. Thus, a corresponding portion may be seen as being brighter than other portions. As a result, the viewer may feel that the light is not uniform. The display device 100 according to the embodiment of the invention can allow light to be uniformly reflected from the reflective sheet 126. Hence, the viewer cannot feel or can feel less the non-uniformity of the light.

FIGS. 13 to 25 illustrate various configurations of a reflective sheet according to the embodiment of the invention.

As shown in FIGS. 13 to 25, a reflective sheet 126 according to the embodiment of the invention may have various configurations capable of improving a luminance.

Figure 13:
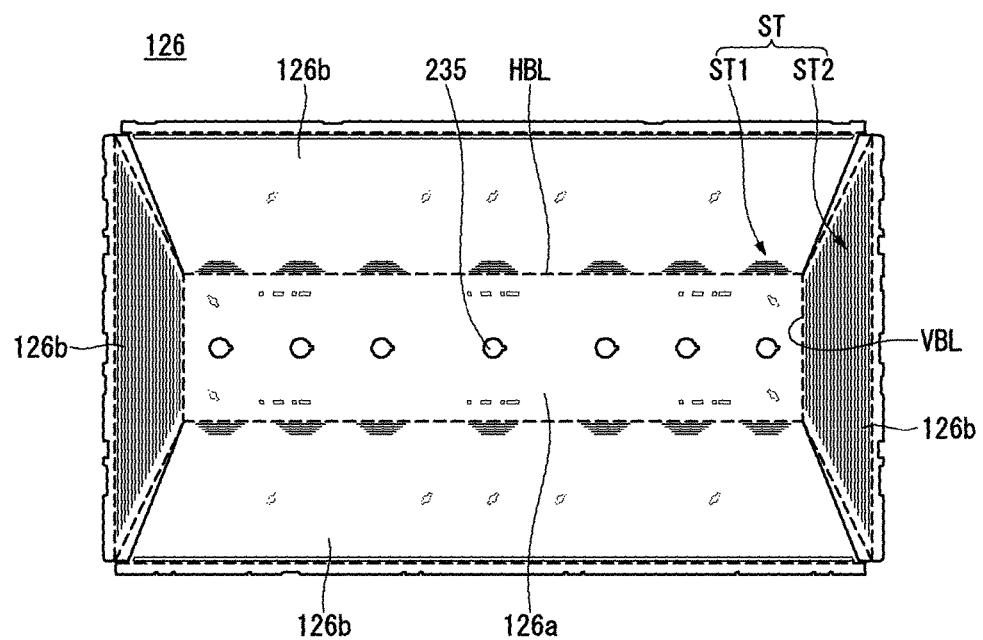
FIGS. 13 to 25 illustrate various configurations of a reflective sheet according to an embodiment of the invention.

As shown in FIG. 13, the reflective sheet 126 according to the embodiment of the invention may include a strip area ST.

The strip area ST may be provided in the second sheet area 126b of the reflective sheet 126. The second sheet area 126b may be a portion spaced apart from the frame 130. Namely, the strip area ST may be formed in the second sheet area 126b spaced apart from the first sheet area 126a contacting the frame 130.

The strip area ST may allow light emitted from the light source coupled to the lens hole 235 to be uniformly emitted to the front. A portion of light emitted from the light source may travel toward the reflective sheet 126, and the reflective sheet 126 may function to reflect light toward the front. When light is concentrated on a specific area of the reflective sheet 126, light reflected from the front of the reflective sheet 126 may make a corresponding area brighter than other areas. Namely, a luminance of light when observed from the front of the reflective sheet 126 may be non-uniform. Even if a brightness of light incident on the reflective sheet 126 is non-uniform, the strip area ST may adjust an amount of reflected light and make a luminance of the reflected light uniform. For example, when a large amount of light is incident on a specific area of the reflective sheet 126, the strip area ST may be formed in a corresponding area. The strip area ST may function to reduce a reflectance of light. Thus, a luminance of reflected light may be entirely uniform.

The strip area ST may have a line shape. The strip area ST may have a predetermined width or height. The strip area ST may be continuously formed. The strip area ST may be a gathering of continuous lines. An attribute of at least one of the lines constituting the strip area ST may be different from an attribute of at least another of the lines constituting the strip area ST. For example, the lines constituting the strip area ST may be different from each other in at least one of a thickness, a length, a color, and a distance of the lines. The strip area ST may include a first strip area ST1 and a second strip area ST2.

The first strip area ST1 may be a strip area positioned on the long side of the reflective sheet 126. In other words, the first strip area ST1 may be a strip area between the lens hole 235 and the long side of the reflective sheet 126. The first strip area ST1 may be positioned in the second sheet area 126b. In other words, the lens hole 235 may be positioned inside a horizontal banding line HBL on the basis of the horizontal banding line HBL, and the first strip area ST1 may be positioned outside the horizontal banding line HBL.

The second strip area ST2 may be a strip area positioned on the short side of the reflective sheet 126. In other words, the second strip area ST2 may be positioned in the second sheet area 126b. In other words, the lens hole 235 may be positioned inside a vertical banding line VBL on the basis of the vertical banding line VBL, and the second strip area ST2 may be positioned outside the vertical banding line VBL.

FIGS. 14 to 19 illustrate various configurations of the first strip area ST1.

Figure 14:
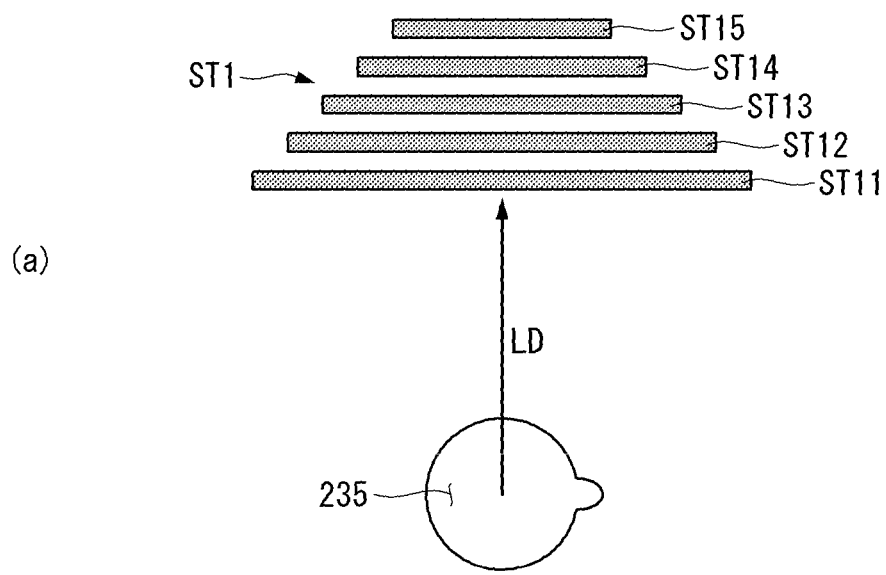
Figure 14:
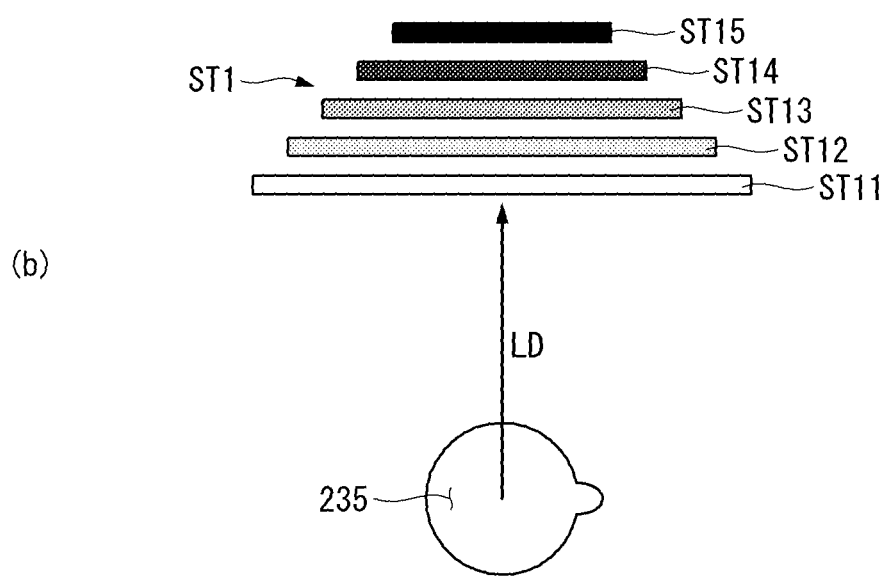

As shown in (a) of FIG. 14, the first strip area ST1 may include a plurality of lines. For example, the first strip area ST1 may include first to fifth lines ST11 to ST15. In the following description, for the convenience of understanding, the first to fifth lines ST11 to ST15 are described by way of example. However, the number of lines constituting the first strip area ST1 may be variously changed.

The light source may be coupled to the lens hole 235 and may emit light. A portion of light emitted from the light source may form a light path LD toward the first strip area ST1.

The first to fifth lines ST11 to ST15 may be formed in a direction perpendicular to the light path La. In other words, the first to fifth lines ST11 to ST15 may be formed in a direction parallel to the long side of the reflective sheet 126.

The first to fifth lines ST11 to ST15 may be distinguished from an area around the first to fifth lines ST11 to ST15. For example; the first to fifth lines ST11 to ST15 may be protruded or recessed. For example, the first to fifth lines ST11 to ST15 each may have a color.

The first to fifth lines ST11 to ST15 may have a reflectance different from a periphery of the first to fifth lines ST11 to ST15 due to the first to fifth lines ST11 to ST15. Namely, because the first to fifth lines ST11 to ST15 each have an uneven portion and/or the color, a reflectance of light incident on the first to fifth lines ST11 to ST15 may be different from a reflectance of the periphery. For example, the reflectance of the first to fifth lines ST11 to ST15 may be less than the reflectance of the periphery.

The first to fifth lines ST11 to ST15 may be positioned in an area on which light emitted from the light source is concentrated. Namely, if the first to fifth lines ST11 to ST15 are omitted, the non-uniformity of the luminance may be generated because of a reflection of light incident on an area corresponding to the omitted first to fifth lines ST11 to ST15. Thus, the first to fifth lines ST11 to ST15 of the reflective sheet 126 according to the embodiment of the invention may be positioned in an area, on which light is concentrated, and may make a reflectance of light uniform.

As shown in (b) of FIG. 14, an attribute of at least one of the first to fifth lines ST11 to ST15 may be different from an attribute of at least another of the first to fifth lines ST11 to ST15. For example, an uneven degree of the first line ST11 may be less than an uneven degree of the fifth line ST15. For example, the first line ST11 may have a color lighter than the fifth line ST15. Thus, a reflectance in the first line ST11 may be different from a reflectance in the fifth line ST15. For example, the reflectance in the first line ST11 may be greater than the reflectance in the fifth line ST15. The reflectance difference may be related to the three-dimensional shape of the reflective sheet 126. Namely, as the frame 130 is coupled to the reflective sheet 126 and approaches the outside of the reflective sheet 126 of a naturally curved shape, an angle of the reflective sheet 126 with respect to the bottom surface of the frame 130 may increase. When the angle of the reflective sheet 126 increases, an amount of light incident on a corresponding area of the reflective sheet 126 may increase. Thus, a luminance of the reflective sheet 126 may be entirely uniform by reducing a reflectance of the fifth line ST15 corresponding to the corresponding area.

Figure 15:
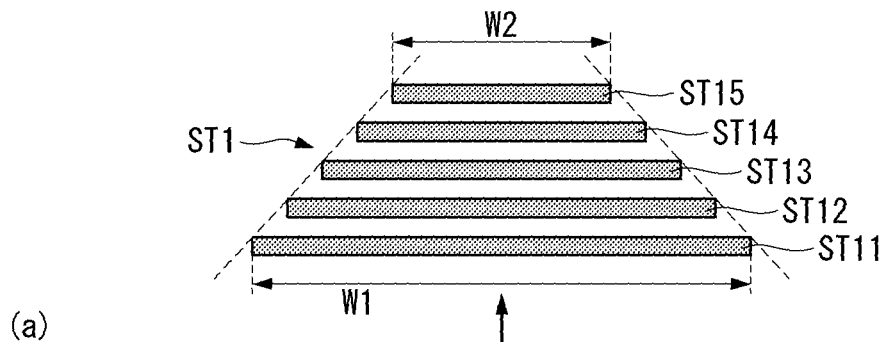
Figure 15:
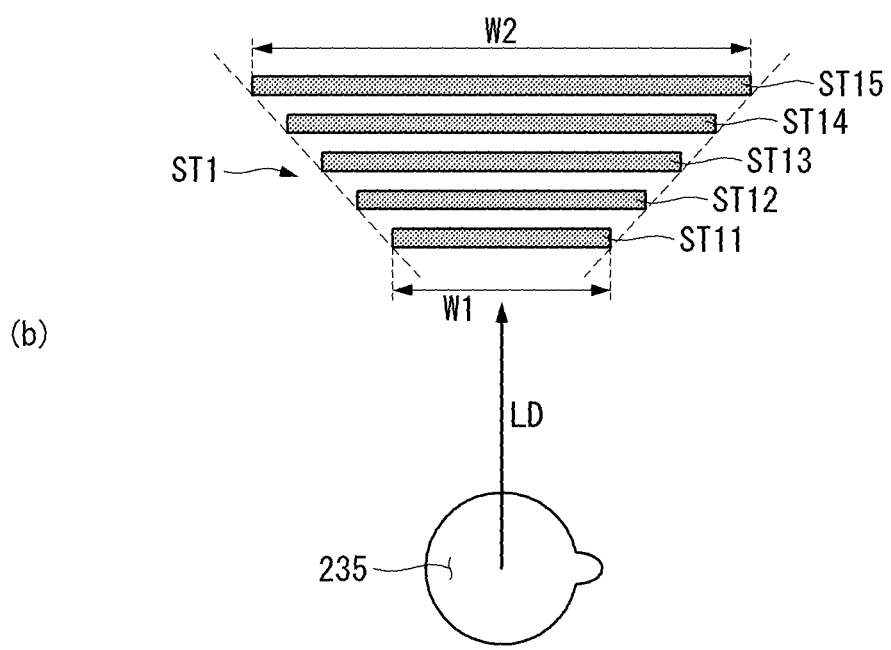

As shown in (a) of FIG. 15, a width of at least one of first to fifth lines ST11 to ST15 constituting the first strip area ST1 may be different from a width of at least another of the first to fifth lines ST11 to ST15. For example, the first line ST11 may have a first width W1, and the fifth line ST15 may have a second width W2. The first width W1 may be greater than the second width W2.

As shown in (b) of FIG. 15, the first width W1 of the first line ST11 may be less than the second width W2 of the fifth line ST15. Widths of the first to fifth lines ST11 to ST15 may be determined in consideration of an amount and a necessary reflectance of light incident on a corresponding area. The widths of the first to fifth lines ST11 to ST15 may be determined in consideration of a width of an incident area of light.

Figure 16:
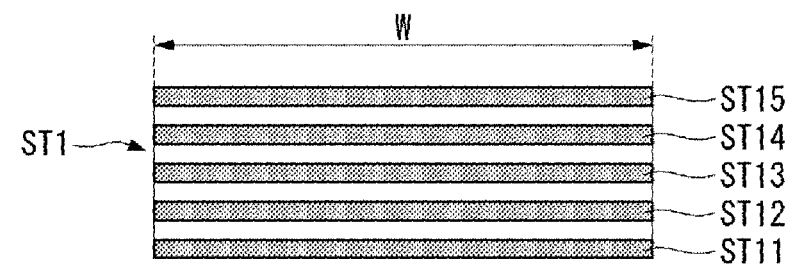
Figure 16:
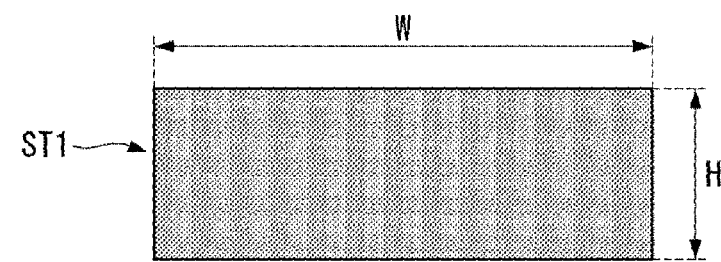

As shown in (a) of FIG. 16, first to fifth lines ST11 to ST15 may have the same width W. Namely, the first to fifth lines ST11 to ST15 having the same width W may be disposed to be spaced apart from one another by a predetermined distance.

As shown in (b) of FIG. 16, a first strip area ST1 may be in a rectangular shape having a width W and a height H. The inside of the first strip area ST1 may be painted with a different color from the outside of the first strip area ST1.

Figure 17:
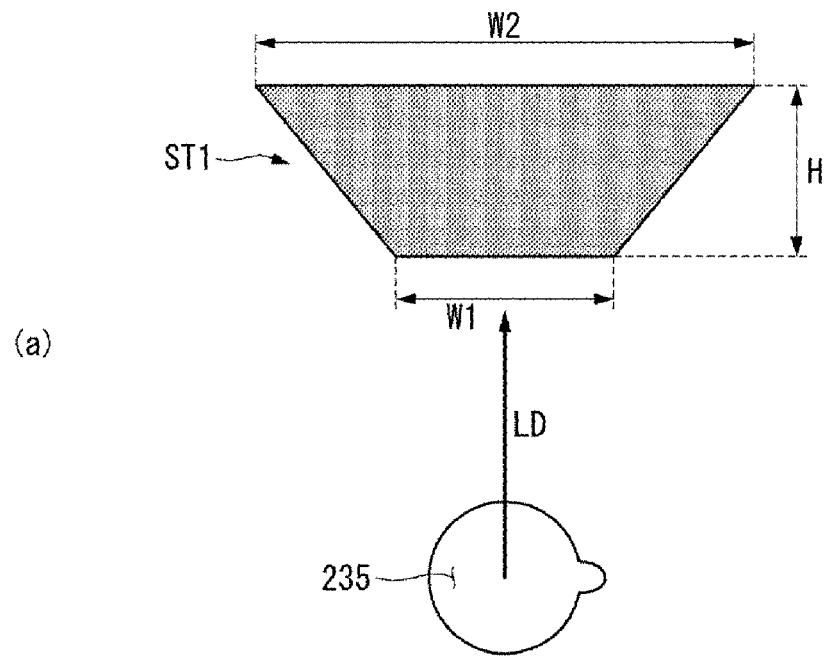
Figure 17:
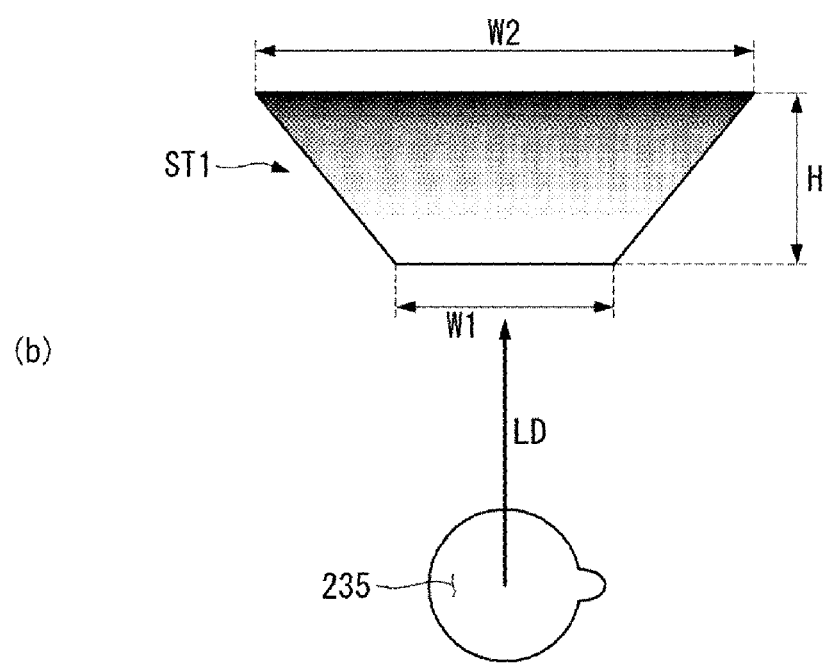

As shown in (a) of FIG. 17, a first strip area ST1 may be configured in a trapezoid shape. For example, a side of the first strip area ST1 close to the lens hole 235 may have a first width W1, and a side of the first strip area ST1 far away from the lens hole 235 may have a second width W2.

As shown in (b) of FIG. 17, an inner configuration of the first strip area ST1 may vary depending on a distance between the first strip area ST1 and the lens hole 235. For example, a portion of the first strip area ST1 close to the lens hole 235 may in a light color, and the color of the first strip area ST1 becomes dark as the first strip area ST1 is far away from the lens hole 235.

Figure 18:
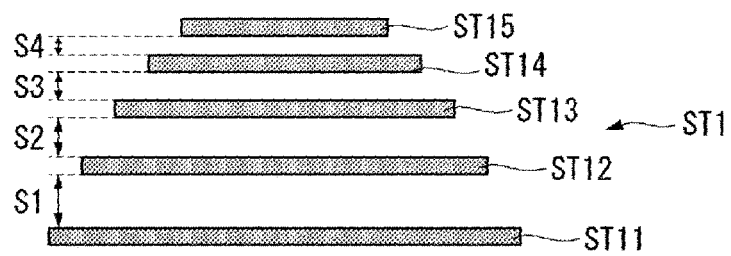
Figure 18:
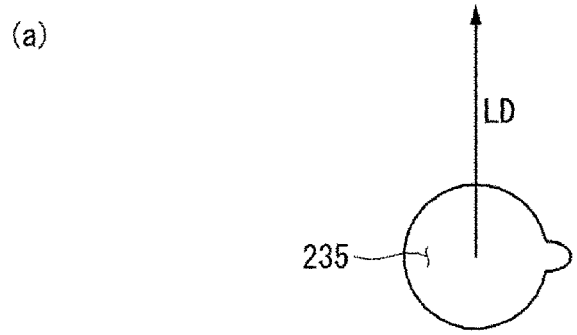
Figure 18:
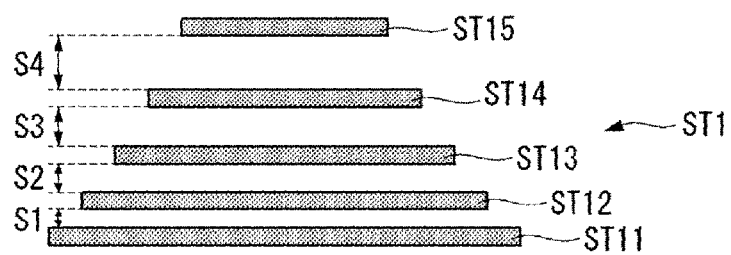
Figure 18:
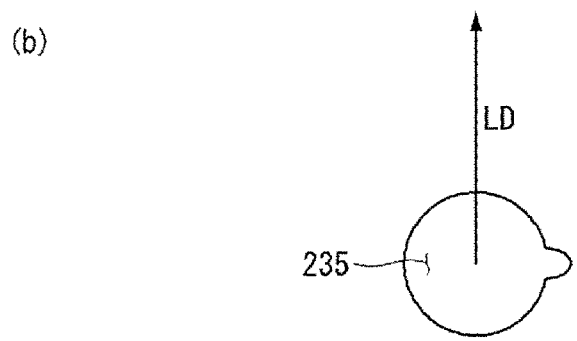

As shown in (a) of FIG. 18, a distance between two lines of first to fifth lines ST11 to ST15 may be different from a distance between two other lines of the first to fifth lines ST11 to ST15. For example, a distance between the first and second lines ST11 and ST12 may be a first distance S1, a distance between the second and third lines ST12 and ST13 may be a second distance 32, a distance between the third and fourth lines ST13 and ST14 may be a third distance S3, and a distance between the fourth and fifth lines ST14 and ST15 may be a fourth distance S4. At least one of the first to fourth distances S1 to S4 may be different from at least another of the first to fourth distances S1 to S4. For example, the first distance S1 may have a maximum value, and values from the second distance S2 to the fourth distance S4 may decrease. Thus, it is possible to adjust a distance in a portion of a first strip area ST1 where a reflectance needs to be adjusted.

As shown in (b) of FIG. 18, first to fourth distances S1 to S4 may be disposed in reverse order of (a) of FIG. 18. For example, the first distance S1 may have a minimum value, and the fourth distance 34 may have a maximum value.

Figure 19:
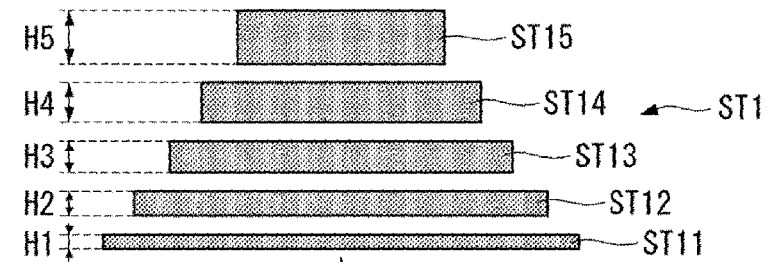
Figure 19:
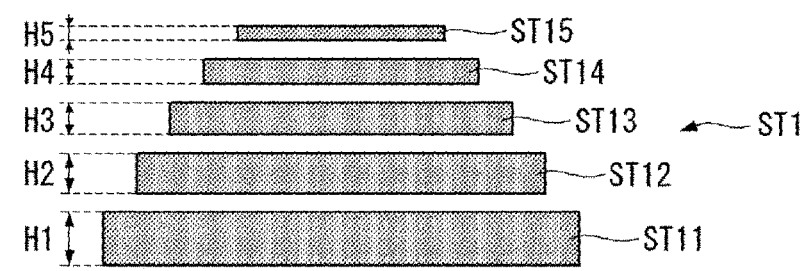

As shown in (a) of FIG. 19, a height of at least one of first to fifth lines ST11 to ST15 may be different from a height of at least another of the first to fifth lines ST11 to ST15. For example, the first line ST11 may have a first height H1, and the fifth ST15 may have a fifth height H5. Further, heights H1 to H5 of the first to fifth lines ST11 to ST15 may gradually increase.

As shown in (b) of FIG. 19, heights of first to fifth lines ST11 to ST15 may be disposed in reverse order of (a) of FIG. 19. In this instance, more light may be concentrated on the first line ST11.

Figure 20:
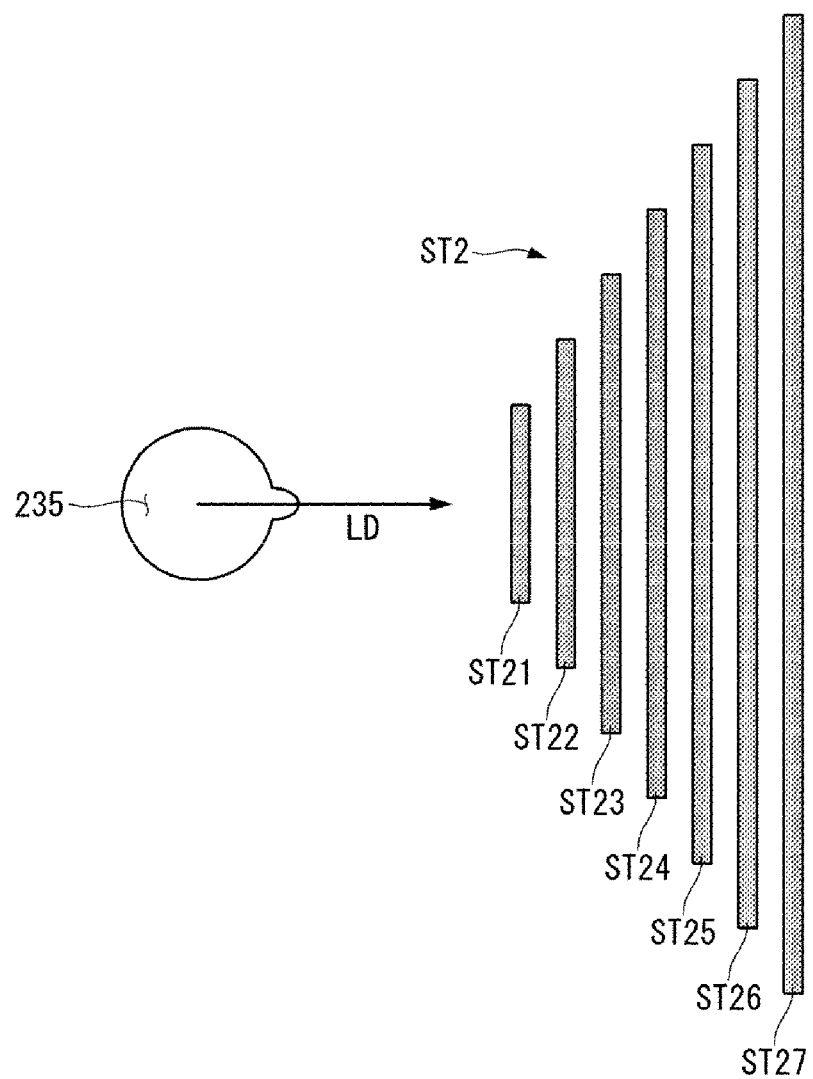
Figure 21:
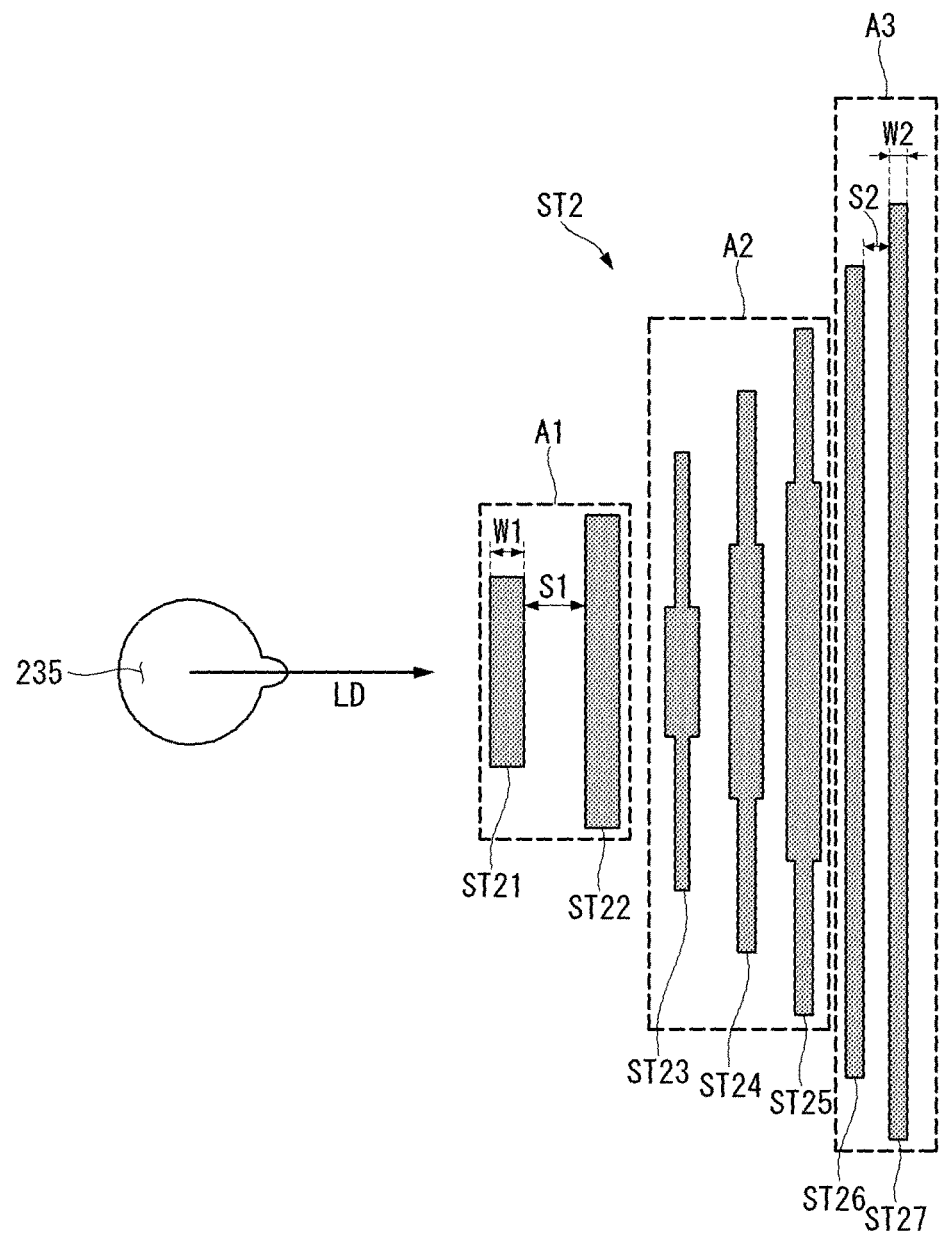
Figure 22:
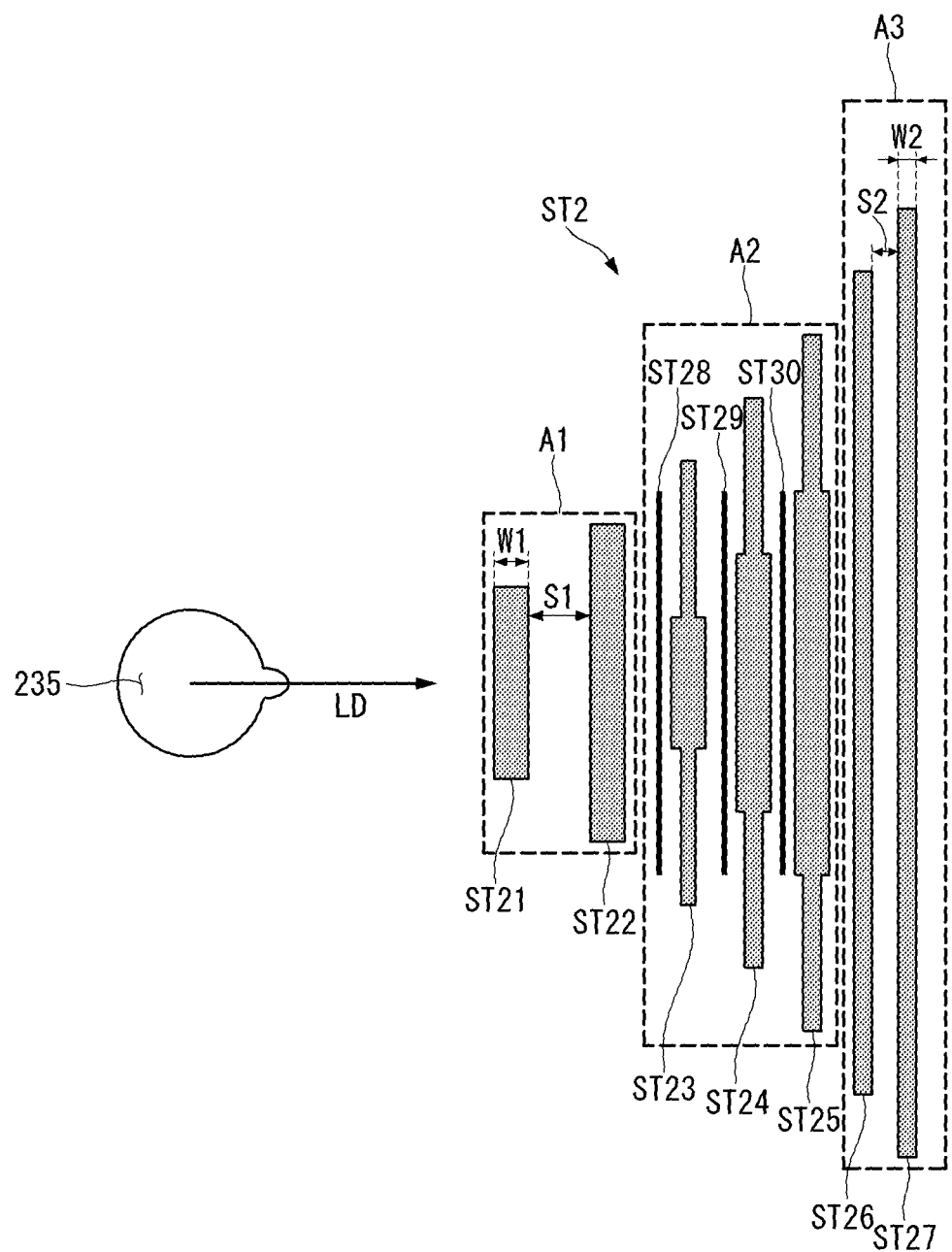

FIGS. 20 to 22 illustrate various configurations of a second strip area.

As shown in FIG. 20, a second strip area ST2 may be disposed in a direction perpendicular to a light path LD. In other words, the second strip area ST2 may be disposed in parallel with the short side of the reflective sheet 126. Further, a direction of the second strip area ST2 may be different from a direction of the first strip area ST1. In other words, the second strip area ST2 may be disposed in a direction perpendicular to the first strip area ST1.

The second strip area ST2 may include first to seventh lines ST21 to ST27. In the following description, for the convenience of understanding, the first to seventh lines ST21 to ST27 included in the second strip area ST2 are described by way of example. However, the number of lines constituting the second strip area ST2 may be variously changed.

An attribute of at least one of the first to seventh lines ST21 to ST27 may be different from an attribute of at least another of the first to seventh lines ST21 to ST27. For example, a length of the first line ST21 may be different from a length of the second line ST22. For example, a width of the first line ST21 may be different from a width of the second line ST22. For example, a color of the first line ST21 may be different from a color of the second line ST22.

As shown in FIG. 21, the second strip area ST2 may be divided into a plurality of areas. For example, each area may include lines having a similar attribute. For example, the plurality of areas may include first to third areas A1 to A3. In the following description, it is assumed that the first area A1 includes first and second lines ST21 and ST22, the second area A2 includes third, fourth, and fifth lines ST23, ST24, and ST25, and the third area A3 includes sixth and seventh lines ST26 and ST27. However, the number of lines included in each area is not limited to them.

The first area A1 may include the first and second lines ST21 and ST22. The first and second lines ST21 and ST22 each may have a first width W1. The first width W1 of the first and second lines ST21 and ST22 may be different from a second width W2 of the sixth and seventh lines ST26 and ST27 constituting the third area A3. The first and second lines ST21 and ST22 may be spaced apart from each other by a first distance S1. The first distance S1 between the first and second lines ST21 and ST22 may be different from a second distance S2 between the sixth and seventh lines ST26 and ST27 constituting the third area A3.

The second area A2 may include the third, fourth, and fifth lines ST23, ST24, and ST25. Each of the third, fourth, and fifth lines ST23, ST24, and ST25 may have varying widths. For example, a width of a center portion of the third line ST23 may be different from widths of both end portions of the third line ST23. The third line ST23 of the second area A2 having the varying widths may be different from the first line ST21 of the first area A1 having the uniform width.

As shown in FIG. 22, a second strip area ST2 according to the embodiment of the invention may further include eighth to tenth lines ST28 to ST30. Each of the eighth to tenth lines ST28 to ST30 may have a predetermined width and may adjust a fine reflectance that has difficulty in the adjustment.

Each of the eighth to tenth lines ST28 to ST30 may be disposed between other lines. For example, the eighth to tenth lines ST28 to ST30 may be disposed between the second, third, fourth, and fifth lines ST22 to ST25.

The eighth to tenth lines ST28 to ST30 may have different attributes from other lines. For example, a width of the eighth to tenth lines ST28 to ST30 may be less than widths of other lines. For example, a length of the eighth to tenth lines ST28 to ST30 may be less than lengths of other lines. Each of the eighth to tenth lines ST28 to ST30 may have the uniform width.

Figure 23:
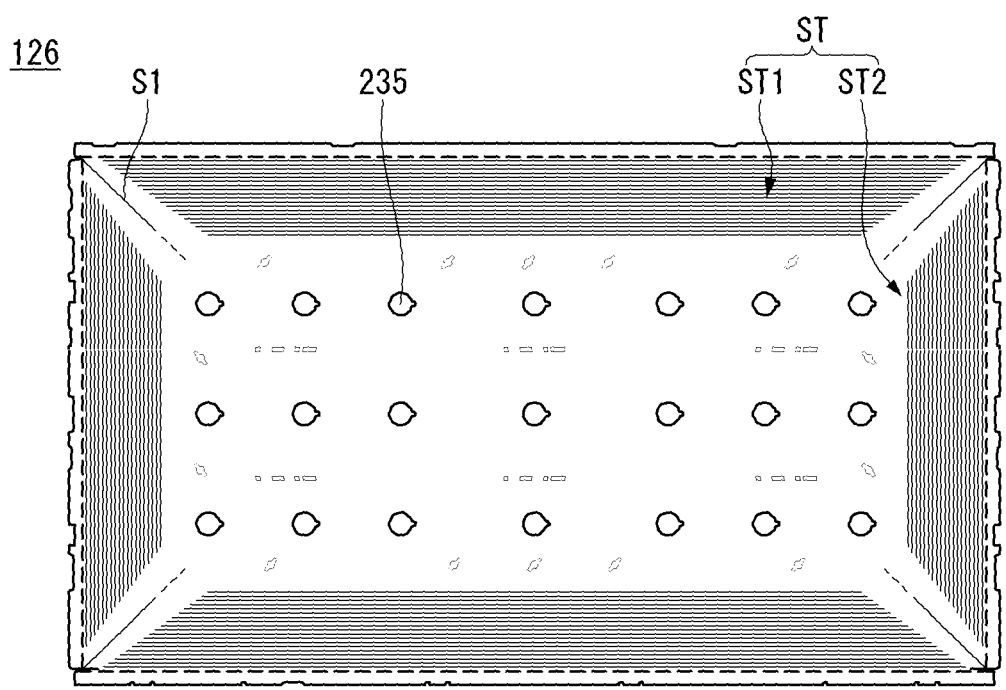
Figure 24:
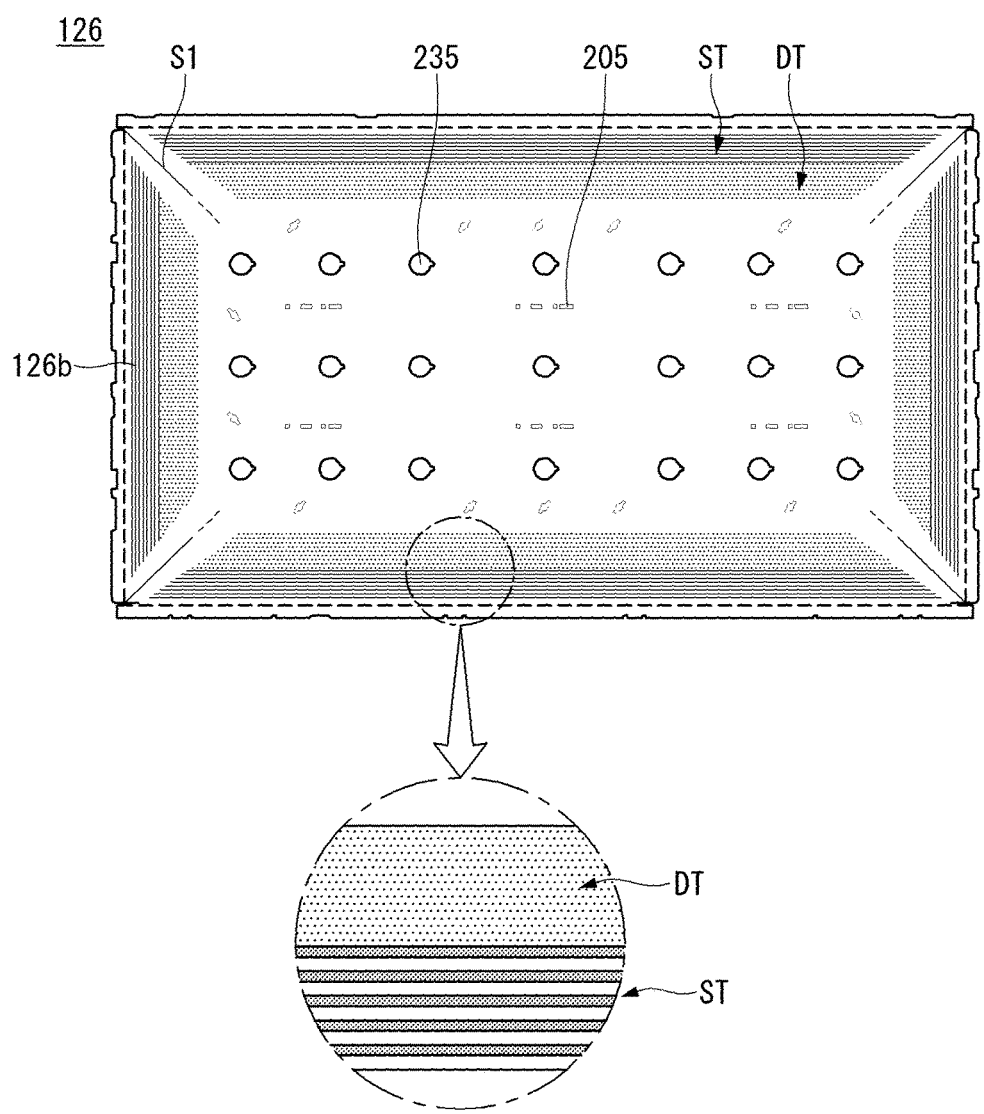
Figure 25:
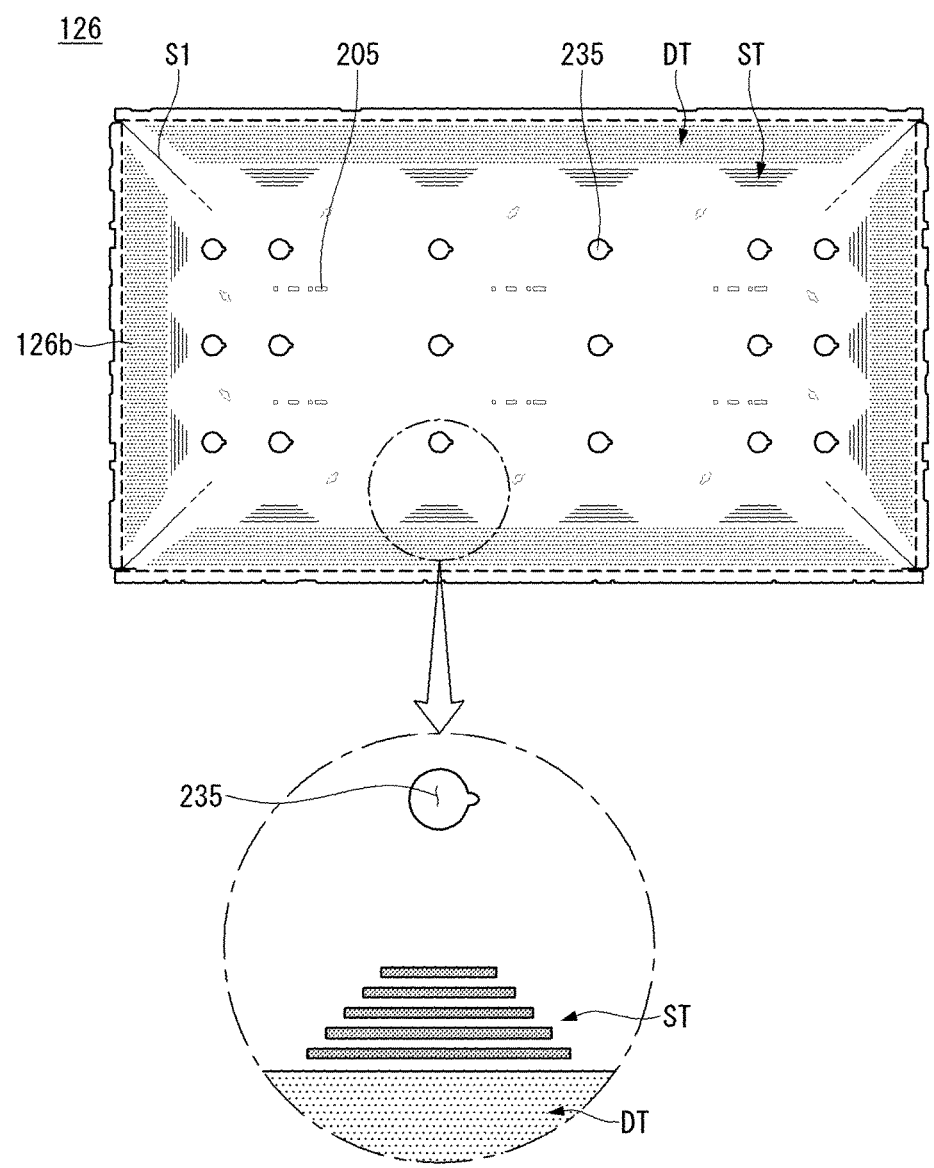

FIGS. 23 to 25 illustrate various configurations of a strip area on the reflective sheet according to the embodiment of the invention.

As shown in FIG. 23, lens holes 235 may be disposed in the reflective sheet 126. For example, the lens holes 235 may be disposed in the first sheet area 126a of the reflective sheet 126.

A strip area ST may be disposed in the second sheet area 126b of the reflective sheet 126. As described above, the second sheet area 126b may be inclined to the first sheet area 126a. Thus, an incident angle of light from the light source may increase, and a luminance of light reflected from a corresponding portion may be greater than that in other portion. First and second strip areas ST1 and ST2 of the second sheet area 126b may reduce a reflectance of the corresponding portion. Thus, the first and second strip areas ST1 and ST2 can make a luminance entirely uniform.

As shown in FIG. 24, the reflective sheet 126 may include both a strip area ST and a dot area DT. For example, the strip area ST may be disposed along the long side and/or the short side of the reflective sheet 126. In other words, the strip area ST may be positioned adjacent to a boundary of the reflective sheet 126. Namely, the lens holes 235 may be disposed closer to the dot area DT than the strip area ST.

The dot area DT may be positioned between the lens holes 235 and the strip area ST. A reflectance of light from the light source incident on the dot area DT may be different from a reflectance of light from the light source incident on the strip area ST. For example, the reflectance of light in the dot area DT may be greater than the reflectance of light in the strip area ST. In other words, the reflectance of light in the strip area ST may be less than the reflectance of light in the dot area DT. As described above, a portion of the reflective sheet 126 close to a side of the reflective sheet 126 may be positioned almost perpendicular to the first sheet area 126a due to the shape of the reflective sheet 126. Thus, more light may be incident on a corresponding portion than other portions. The strip area ST formed in the corresponding portion can reduce a reflectance of the corresponding portion and can make the luminance entirely uniform.

As shown in FIG. 25, the strip area ST may be positioned between the lens holes 235 and the dot area DT. The strip area ST may be positioned corresponding to at least one lens hole 235. The strip area ST may be positioned corresponding to each lens hole 235. The strip area ST may protrude toward the lens hole 235. Thus, the strip area ST may be disposed at a location close to the light source coupled to the lens hole 235. Further, the strip area ST can efficiently adjust a reflectance of light incident from the light source adjacent to the strip area ST.

Figure 26:
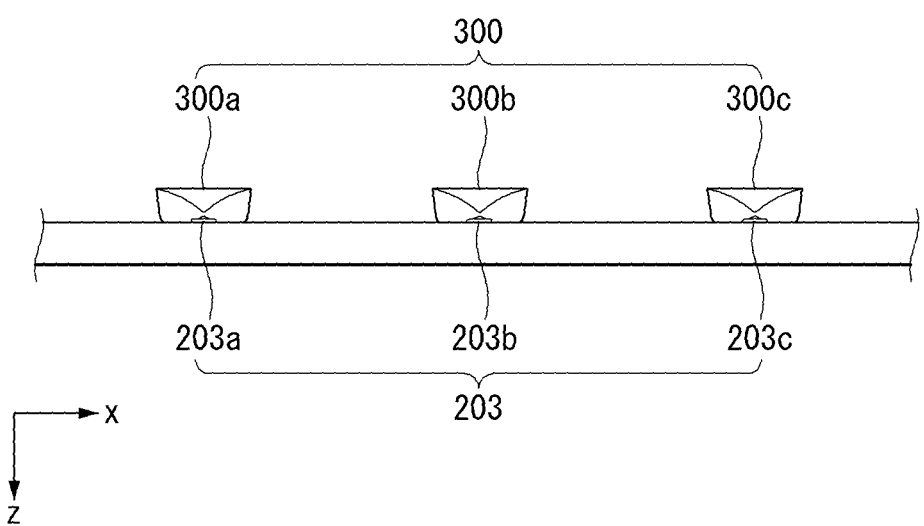
FIG. 26 illustrates a light assembly including a light source shown in FIG. 10.

FIG. 26 illustrates a light assembly including a light source shown in FIG. 10.

As shown in FIG. 26, a plurality of light assemblies 124 according to the embodiment of the invention may be disposed along the substrate 122 and spaced apart from one another. Each light assembly 124 may include a light source 203 and a lens 300 positioned on one side of the light source 203.

The light source 203 may be various sources emitting light. For example, the light source 203 may be a COB type LED as described above.

The lens 300 may be positioned on the light source 203. At least a portion of the light source 203 may overlap the lens 300. For example, the light source 203 may be inserted into a groove inside the lens 300. Alternatively, a portion of the light source 203, from which light is substantially emitted, may be inserted into a lower side of the lens 300. For example, when the lens 300 has a leg structure, a portion of an upper side of the light source 203 may be inserted into the lower side of the lens 300.

The lens 300 may reflect a portion of light emitted from the light source 203 and may refract a portion of the light. For example, the lens 300 may be a refractive lens or a reflective lens. The light emitted from the light source 203 may be uniformly and entirely spread through the reflection in a portion of the lens 300 and/or the refraction in a portion of the lens 300.

The light source 203 inserted into the lens 300 may be adhered to the lens 300. For example, the lens 300 and the light source 203 may be attached to each other using an adhesive.

The lens 300 may correspond to each light source 203. For example, first to third lenses 300a to 300c may be respectively positioned on first to third light sources 203a to 203c.

The lens 300 may control a path of light emitted from the light source 203. Namely, the lens 300 may control the light source 203 so that the light of the light source 203 is not concentrated on a specific location. In other words, the lens 300 may cause the light of the light source 203 to be uniformly diffused. The lens 300 according to the embodiment of the invention may efficiently control the path of the light of the light source 203. The lens 300 according to the embodiment of the invention may efficiently control side light emitted from the light source 203.

Figure 27:
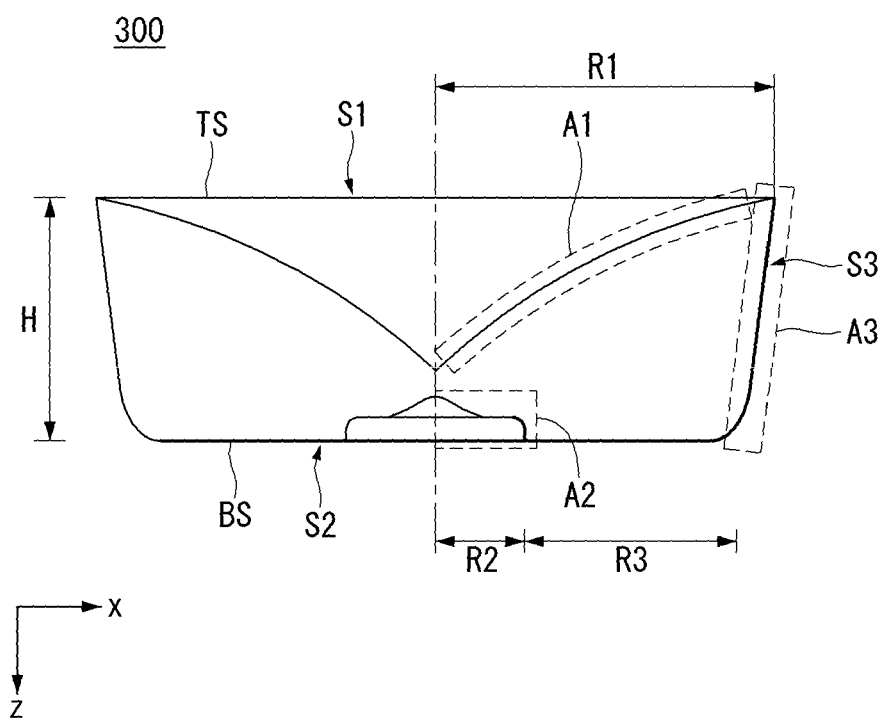
FIGS. 27 and 28 illustrate a lens according to an embodiment of the invention.
Figure 28:
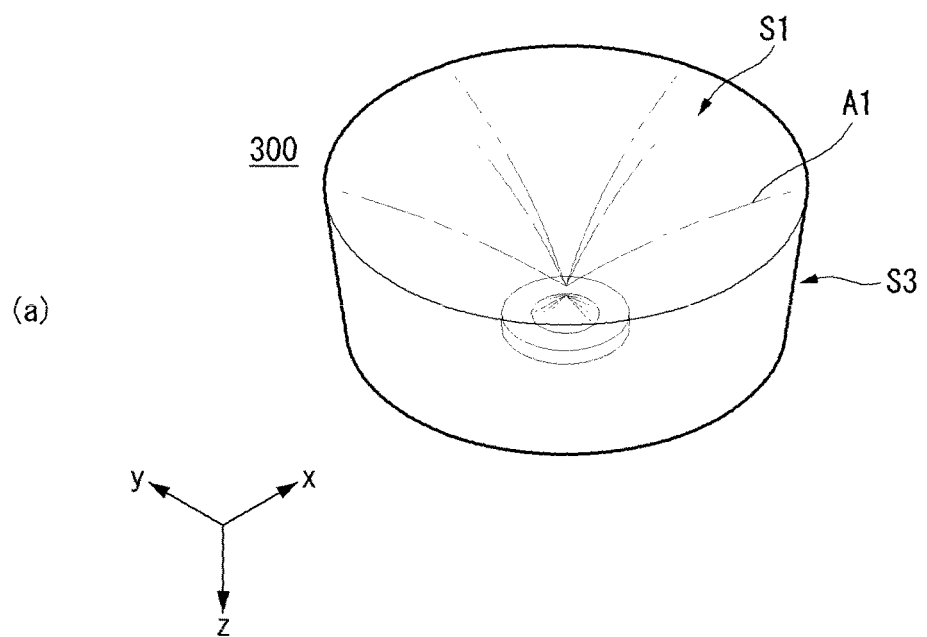
Figure 28:
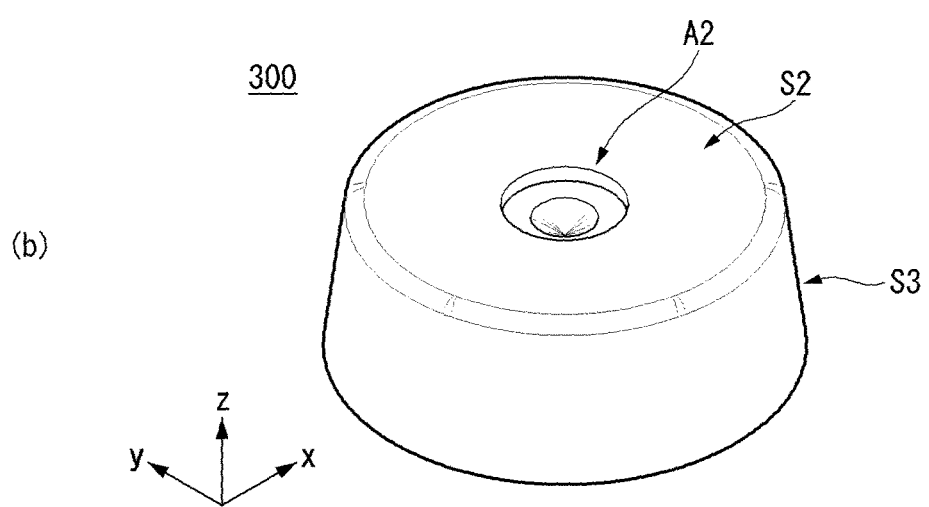

FIGS. 27 and 28 illustrate a lens according to the embodiment of the invention.

As shown in FIGS. 27 and 28, a lens 300 according to the embodiment of the invention may have a specific shape.

The lens 300 may include a first surface S1, a second surface S2 opposite the first surface S1, and a third surface S3 connecting the first surface S1 and the second surface S2.

The first surface S1 may be an upper surface of the lens 300. At least a portion of the first surface S1 of the lens 300 according to the embodiment of the invention may be recessed (or a recess). The recess of the first surface S1 may have a shape curved from the center of the lens 300 toward the outside of the lens 300. For example, a first concave portion A1 may be formed on the first surface S1.

An uppermost portion of the first surface S1 may be a top surface TS. The first surface S1 may have a circular cross-sectional shape. Light emitted from the upper side of the light source 203 may be upwardly emitted through the first surface S1 of the lens 300.

The second surface S2 may be a lower surface of the lens 300. Namely, the second surface S2 may be a surface opposite the first surface S1 corresponding to the upper surface of the lens 300. At least a portion of the second surface S2 of the lens 300 according to the embodiment of the invention may be recessed (or a recess). For example, a second concave portion A2 may be formed on the second surface S2.

A radius of the second concave portion A2 on the second surface S2 may be denoted as R2. The radius R2 of the second concave portion A2 may be 1.5 to 4 times a radius of the light source 203 coupled to the lens 300.

A lowermost portion of the second surface S2 may be a bottom surface BS. The second surface S2 may have a circular cross-sectional shape. The light source 203 may be coupled to the second surface S2. As described above, a portion of the light source 203 may be inserted into the second surface S2.

A radius of the second surface S2 may be "R2+R3". A radius R1 of the first surface S1 may be 1 to 3 times the radius (R2+R3) of the second surface S2. Namely, a width of the top surface TS may be greater than a width of the bottom surface BS.

The radius (R2+R3) of the second surface S2 may be 2 to 4 times a radius R2 of the second concave portion A2.

The third surface S3 may be a surface connecting the first surface S1 and the second surface S2. Namely, the third surface S3 may be a side surface connecting the upper surface and the lower surface of the lens 300. The first surface S1 and the second surface S2 each have the circular cross section, and the third surface S3 forms an outer surface connecting the first surface S1 and the second surface S2. Therefore, the lens 300 may have an outline of a cylindrical shape having a height H. In the cylindrical shape of the lens 300, at least a portion of the first to third surfaces S1 to S3 may be changed.

Figure 29:
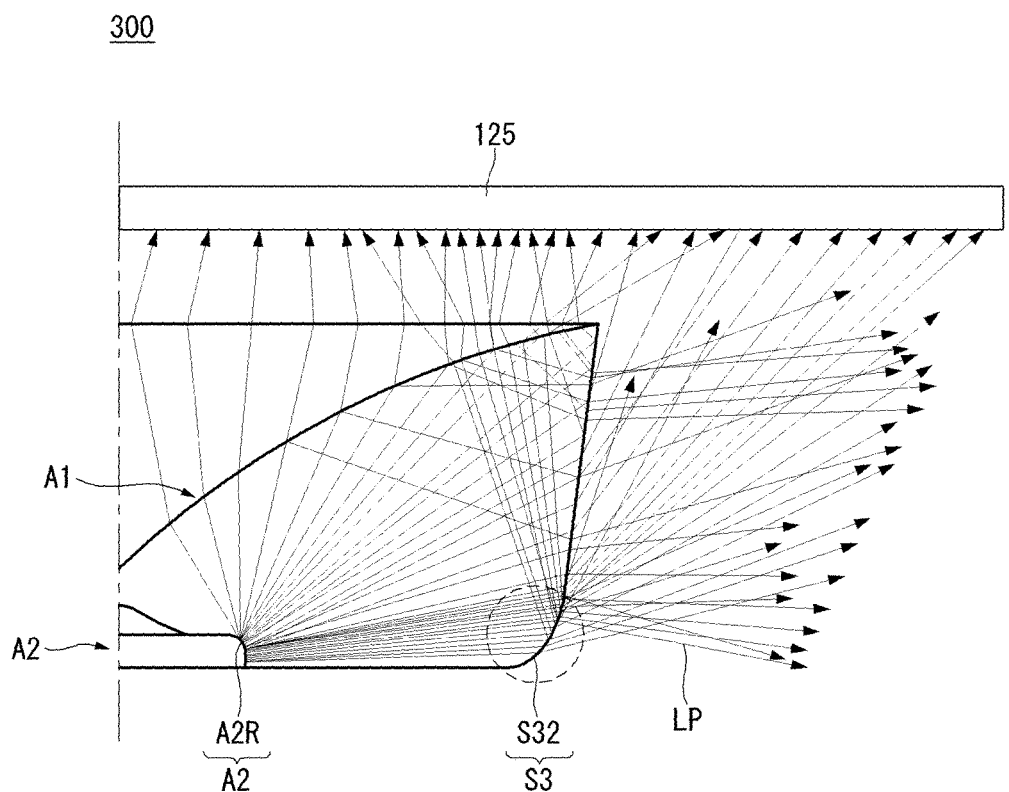
FIG. 29 illustrates an example of a light path of a lens shown in FIG. 26.

FIG. 29 illustrates an example of a light path of a lens shown in FIG. 27.

As shown in FIG. 29, the lens 300 according to the embodiment of the invention may control a path LP of light and may cause the light to be uniformly transferred to the optical sheet 125. In particular, the lens 300 according to the embodiment of the invention may change the path LP of light emitted from the side of the light source 203.

The light emitted from the side of the light source 203 may be firstly diffused from the second concave portion A2. Namely, as described above, the light path LP may be radiated due to a shape of a third area A2R of the second concave portion A2.

The light path LP distributed from the side of the second concave portion A2 may be again radiated via a curved surface S32 of the third surface S3.

At least a portion of the light path LP passing through the second concave portion A2, etc., may be refracted and/or reflected from the first concave portion A1. Thus, the light path LP may be prevented from being concentrated on a specific location. As a result, light may be uniformly distributed on the optical sheet 125.

FIGS. 30 to 35 illustrate a lens according to another embodiment of the invention.

As shown in FIGS. 30 to 35, the lens 300 according to the embodiment of the invention may be variously configured.

Figure 30:
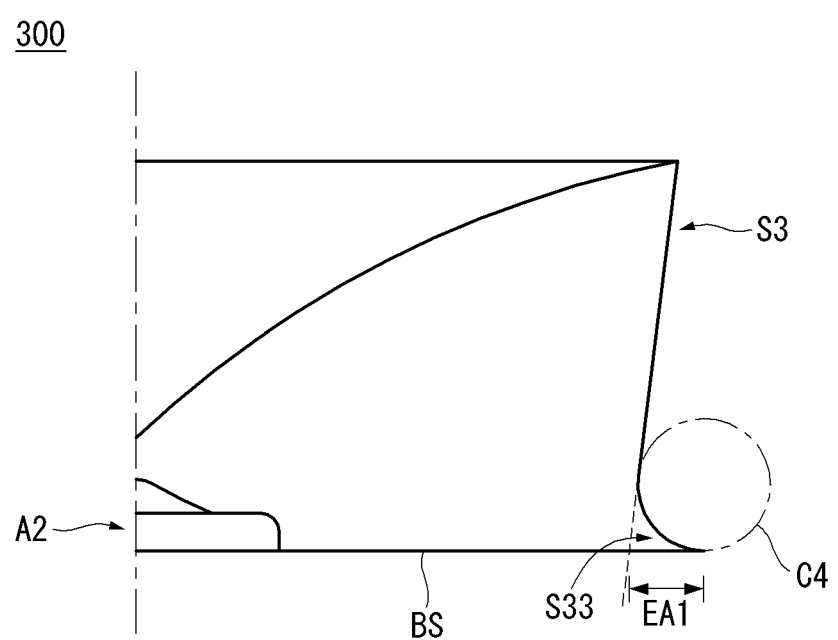
FIGS. 30 to 35 illustrate a lens according to another embodiment of the invention.

As shown in FIG. 30, a curved surface S33 of the third surface S3 may have a shape protruding toward the outside of the lens 300. For example, the curved surface S33 may form a curved surface S32 corresponding to an imaginary fourth circle C4 adjoining an external surface of the third surface 33. The curved surface S33 may have the shape extended from the second surface S2 by a distance EA1.

Figure 31:
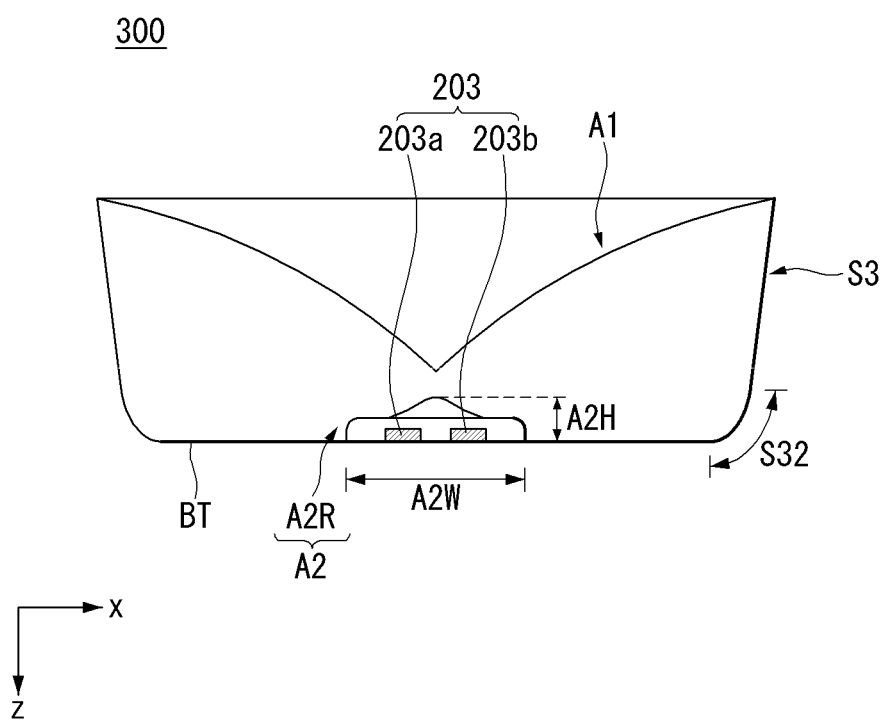

As shown in FIG. 31, the plurality of light sources 203 may correspond to one lens 300. For example, first and second light sources 203a and 203b may be positioned inside the second concave portion A2.

The light source 203 may have the relatively small size. The light source 203 may have a performance of high power. Thus, the first and second light sources 203a and 203b may correspond to one lens 300.

The second concave portion A2 may have an oval shape. For example, the second concave portion A2 may have a shape, in which a width A2W of the second concave portion A2 is greater than a height A2H of the second concave portion A2. The plurality of light sources 203a and 203b may be positioned in a space obtained by configuring the second concave portion A2 in the oval shape.

When the plurality of light sources 203 are positioned inside the second concave portion A2, the shape of the second concave portion A2 and/or the curved surface S32 of the third surface S3 may perform an important function in the embodiment of the invention. Namely, because a large amount of side light may be generated from the first and second light sources 203a and 203b, it is necessary to more efficiently control the side light. The embodiment of the invention may efficiently distribute the side light through the curved third area A2R on the side of the second concave portion A2 and/or the curved surface S32 on the lower side of the third surface S3.

Figure 32:
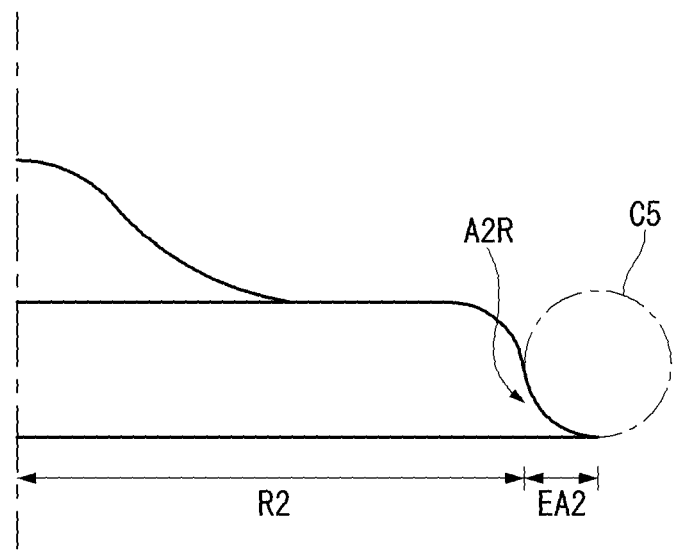

As shown in FIG. 32, the third area A2R of the second concave portion A2 may have a shape of a curved surface protruding to the outside of the lens 300. For example, the third area A2R may have a shape of a curved surface corresponding to an imaginary fifth circle C5 adjoining the third area A2R of the second concave portion A2 outside the second concave portion A2. In this instance, a length of the second concave portion A2 may be extended by a distance EA2.

Figure 33:
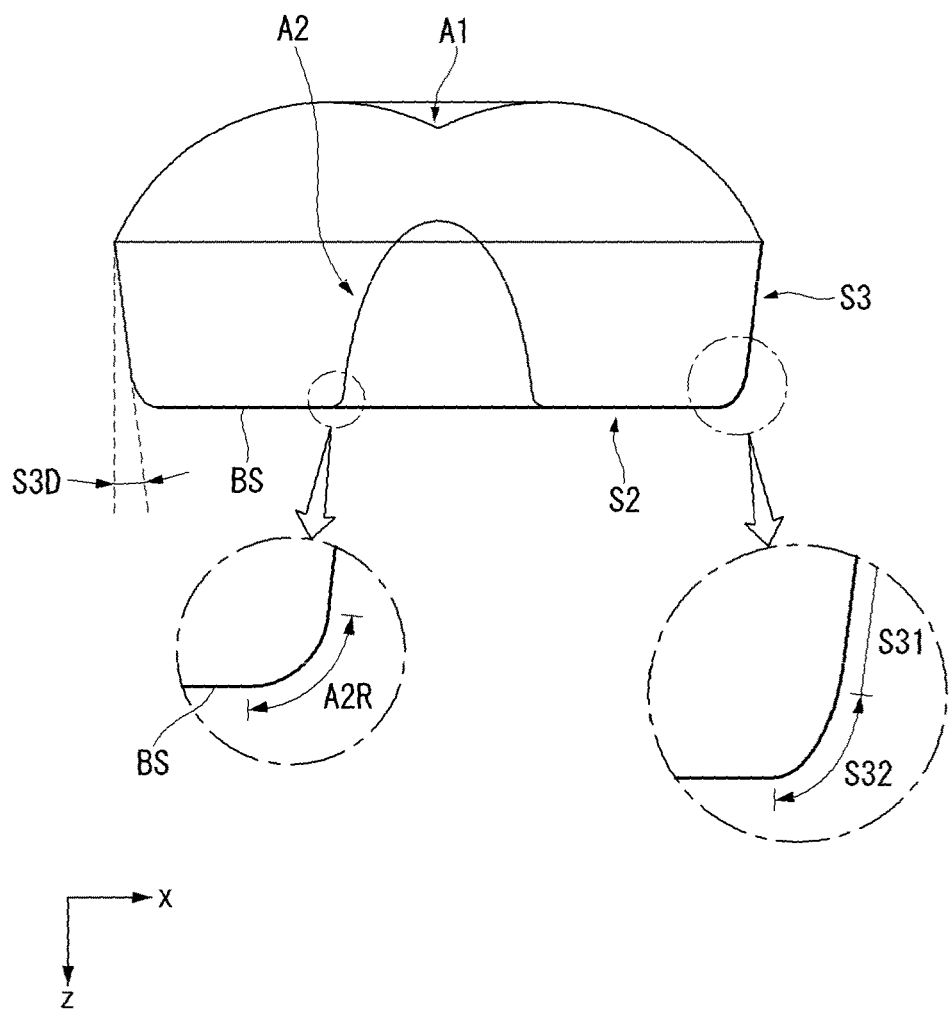
Figure 34:
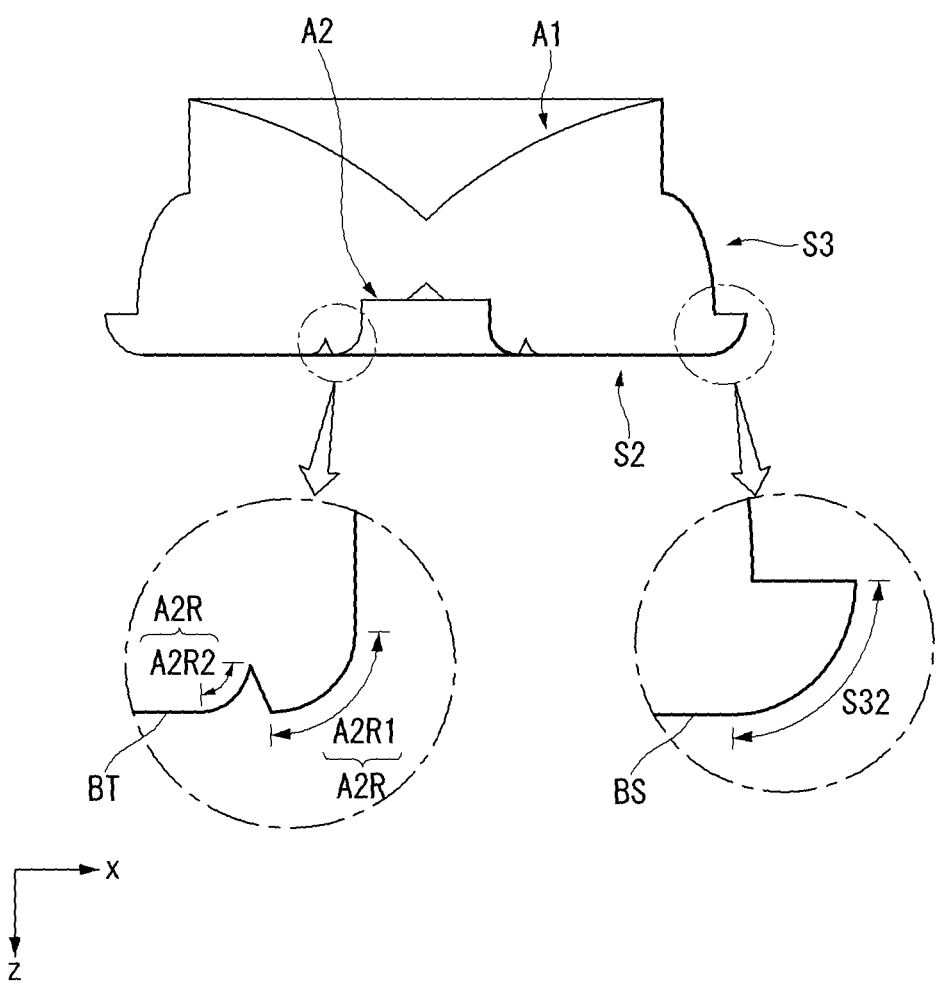
Figure 35:
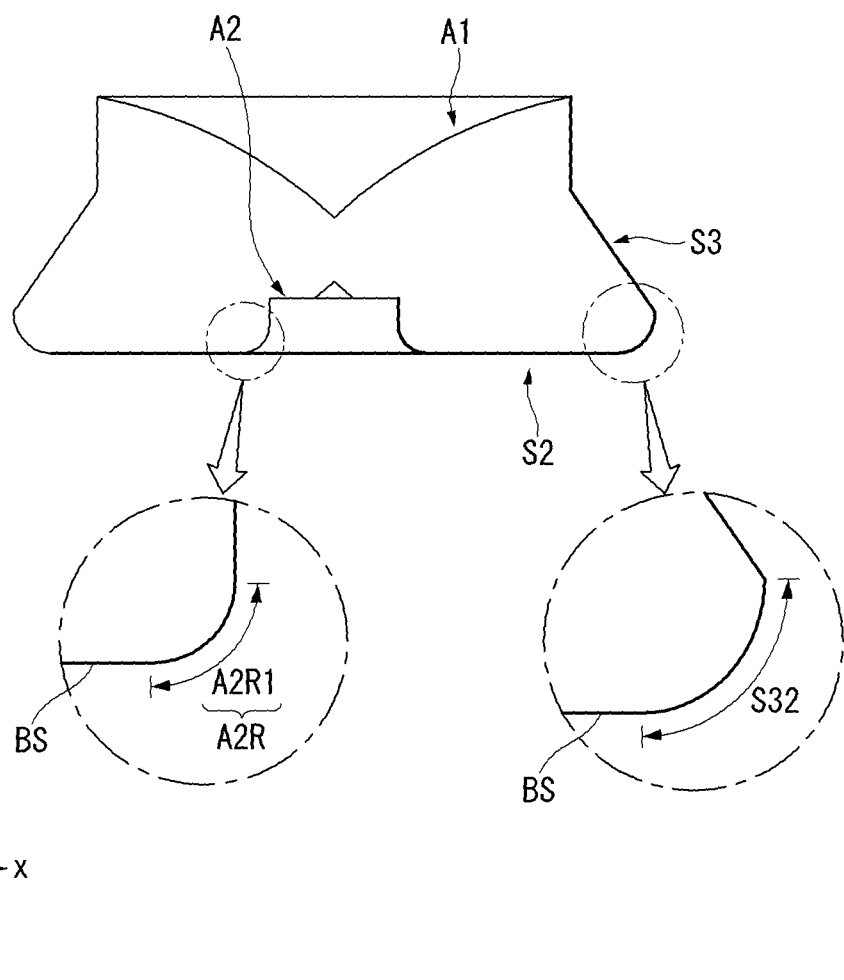

As shown in FIGS. 33 to 35, the embodiment of the invention may be applied to the lens 300, which may be configured in various shapes.

As shown in FIG. 33, the third surface 33 may have a shape inclined at a predetermined angle. For example, the third surface S3 may have a shape inclined to the inside by an angle 53D from the vertical line.

The third surface S3 may include a straight surface S31 and a curved surface S32. The curved surface 332 may be connected to the second surface 32.

The third area A2R may be formed on the second concave portion A2. Namely, a curved surface may be formed in an area extended from the lower side of the second concave portion A2 to the bottom surface BS. The light emitted from the light source may be distributed due to the third area A2R. In particular, the third area A2R may improve the uniformity of the light emitted from the side of the light source.

As shown in FIG. 34, a predetermined curved surface S32 may be formed in an area where the third surface S3 of the lens 300 and the bottom surface BS meet.

Third areas A2R1 and A2R2 may be formed on the second concave portion A2. Namely, a curved surface may be formed in a portion of an area where the second concave portion A2 and the bottom surface BS meet. The third areas A2R1 and A2R2 may include a 3a area A2R1 and a 3b area A2R2. Namely, a plurality of curved surfaces may be formed in a plurality of areas where the second concave portion A2 and the bottom surface BS meet.

As shown in FIG. 35, a curved surface S32 may be formed in an area where the third surface S3 of the lens 300 and the bottom surface BS meet. The third area A2R of the curved surface may be formed on the second concave portion A2.

Figure 36:
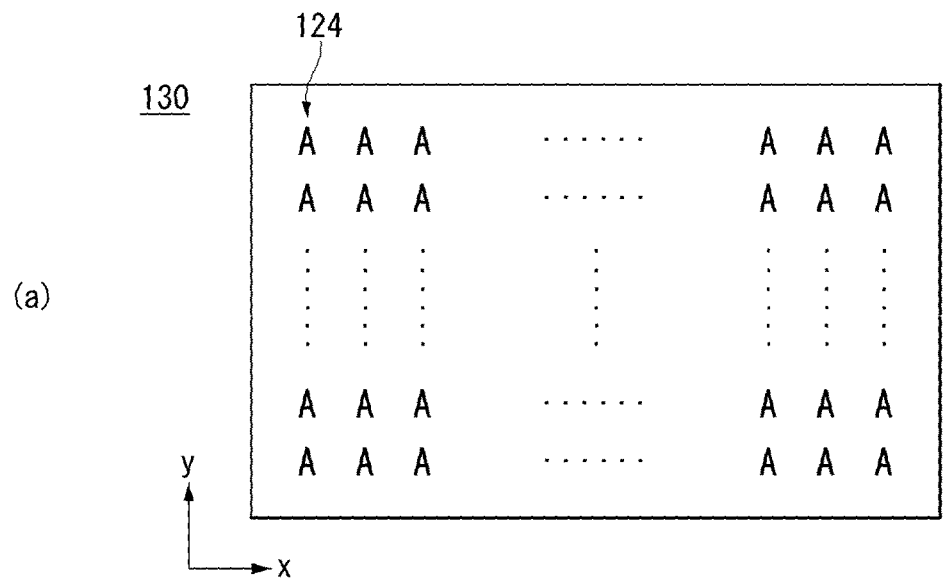
FIGS. 36 and 37 illustrate a disposition of a light assembly according to another embodiment of the invention.
Figure 36:
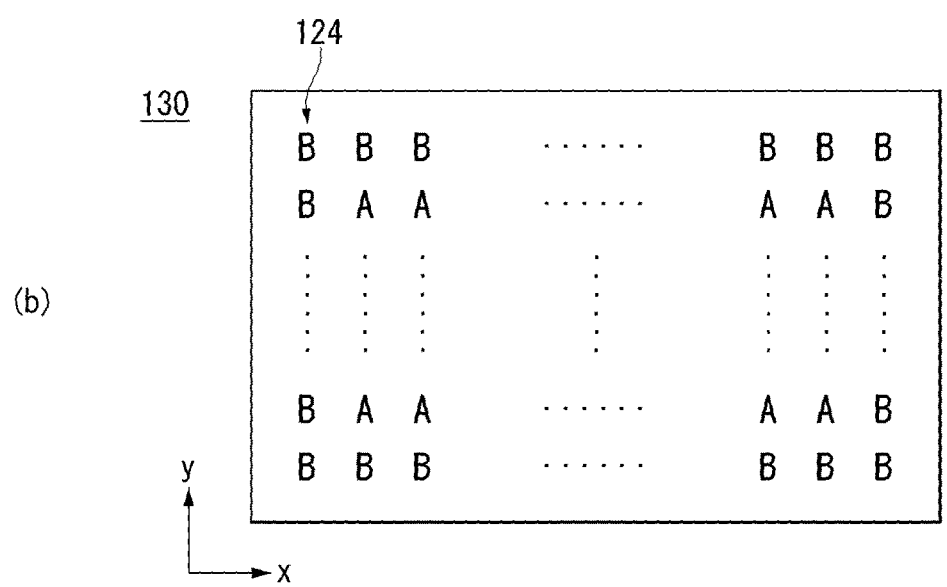
Figure 37:
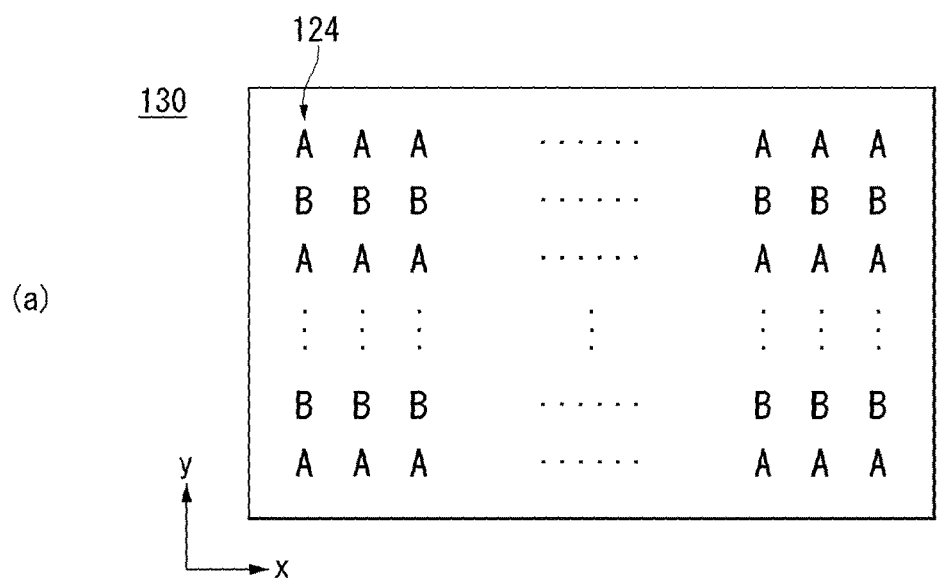
Figure 37:
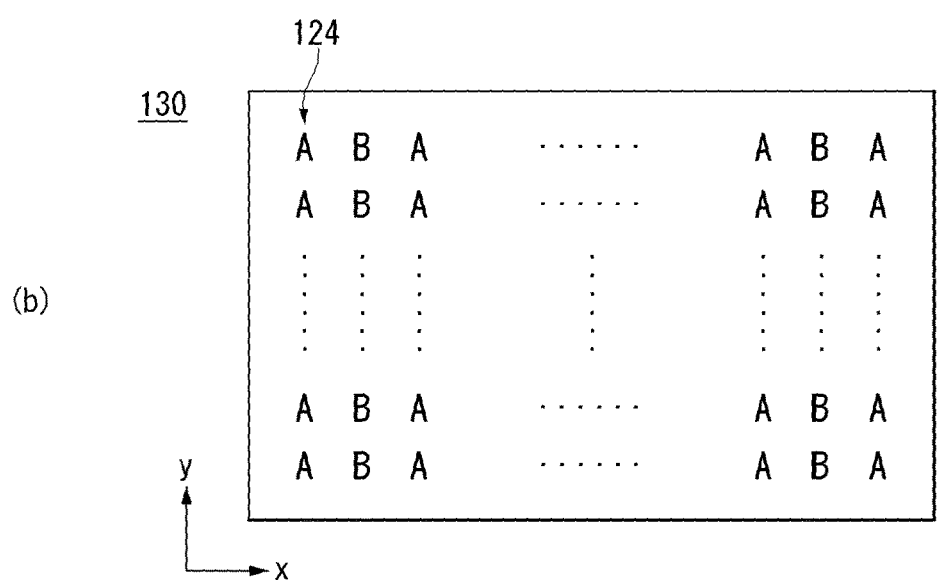

FIGS. 36 and 37 illustrate a disposition of a light assembly according to another embodiment of the invention.

As shown in FIGS. 36 and 37, the light assembly 124 may be positioned on the frame 130. The light assembly 124 may be configured in various shapes depending on a location. The light assembly 124 may include at least one of the lenses 300 having the above-described shapes. Thus, a contrast or a hot spot resulting from the lens 300 may be prevented from being generated.

As shown in (a) of FIG. 36, the light assembly 124 may be positioned on the frame 130. In FIGS. 36 and 37, alphabets "A" and "B" indicate the light assembly 124. Namely, the light assemblies 124 may be arranged in the horizontal and vertical directions.

The light assemblies 124 shown in (a) of FIG. 36 may be the A-type light assemblies 124. For example, the light assembly 124 including the lens 300 of a specific shape may be positioned.

As shown in (b) of FIG. 36, the A-type light assemblies 124 and the B-type light assemblies 124 may be arranged. For example, the light assemblies 124 including two types of lenses 300 may be arranged. In this instance, the B-type light assemblies 124 may be arranged on the outermost side of an array of the light assemblies 124, and the A-type light assemblies 124 may be arranged in an inner area of the array.

The light assemblies 124 different from the light assemblies 124 arranged in the inner area of the array may be arranged on the outermost side of the array. Thus, the light assembly 124 positioned on the outermost side of the array may include the lens 300 different from the light assembly 124 positioned in the inner area of the array, so as to uniformly distribute light.

As shown in (a) and (b) of FIG. 37, at least two types of light assemblies 124 may be alternately arranged. For example, the light assemblies 124 each including the A-type lens 300 and the light assemblies 124 each including the B-type lens 300 may be alternately arranged in the horizontal direction or the vertical direction.

The embodiments and/or the configurations of the invention may be combined with each other. For example, a configuration "A" described in one embodiment of the invention and the drawings and a configuration "B" described in another embodiment of the invention and the drawings may be combined with each other. Namely, although the combination between the configurations is not directly described, the combination is possible except in the instance where it is described that the combination is impossible. This is certain considering that the embodiment of the invention relates to the display device.

In one aspect, there is provided a backlight unit including a frame including a bottom area and a sidewall area extended from the bottom area; at least one substrate positioned at a front surface of the frame, a plurality of light sources being mounted on the at least one substrate; a reflective sheet positioned at a front surface of the at least one substrate and including a strip area in at least a portion of the reflective sheet, a reflectance of the at least the portion of the reflective sheet being different from a reflectance of at least another portion of the reflective sheet; and an optical sheet positioned at a front surface of the reflective sheet.

The reflective sheet may include a first sheet area contacting the bottom area of the frame and including a plurality of lens holes, and a second sheet area spaced apart from the bottom area of the frame. The strip area may be disposed in the second sheet area.

The strip area may include a first strip area disposed in parallel with a long side of the reflective sheet and a second strip area disposed in parallel with a short side of the reflective sheet.

The reflective sheet may include a first sheet area contacting the bottom area of the frame and including a plurality of lens holes. The strip area may include a plurality of strip areas. The plurality of strip areas may be disposed corresponding to the plurality of lens holes.

The strip area may include a plurality of lines spaced apart from one another by a predetermined distance.

At least one of the plurality of lines may be different from at least another of the plurality of lines in at least one of a length, a width, and a color.

A distance between two lines of the plurality of lines may be different from a distance between two other lines of the plurality of lines.

At least one of the plurality of lines may have different widths at a first location and a second location.

The reflective sheet may further include a dot area.

The reflective sheet may include a first sheet area contacting the bottom area of the frame and including a plurality of lens holes, and a second sheet area spaced apart from the bottom area of the frame. The strip area and the dot area may be disposed in the second sheet area.

The dot area may be positioned between an outermost lens hole of the plurality of lens holes and the strip area.

In another aspect, there is provided a display device including a frame including a bottom area and a sidewall area extended from the bottom area; at least one substrate on which a plurality of light sources is mounted; a reflective sheet positioned at a front surface of the at least one substrate and including a strip area in at least a portion of the reflective sheet, a reflectance of the at least the portion of the reflective sheet being different from a reflectance of at least another portion of the reflective sheet; an optical sheet positioned at a front surface of the reflective sheet; and a display panel positioned at a front surface of the optical sheet.

The reflective sheet may include a first sheet area contacting the bottom area of the frame and including a plurality of lens holes, and a second sheet area spaced apart from the bottom area of the frame. The strip area may be disposed in the second sheet area.

The strip area may include a first strip area disposed in parallel with a long side of the reflective sheet and a second strip area disposed in parallel with a short side of the reflective sheet.

The reflective sheet may include a first sheet area contacting the bottom area of the frame and including a plurality of lens holes, and a second sheet area spaced apart from the bottom area of the frame. A dot area and the strip area are disposed in the second sheet area.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a frame having a recess on a front side and including a bottom area and a sidewall area that extends from the bottom area;
   a substrate positioned over the front side of the frame, a plurality of light sources being mounted on the substrate;
   a reflective sheet positioned over a front surface of the substrate, the reflective sheet including a first edge and a second edge connected to the first edge, and the reflective sheet being elongated along the first edge, the reflective sheet including:
   a first sheet area that contacts the bottom area of the frame; and
   a second sheet area that extends from the first sheet area and extending away from the bottom area; and
   an optical sheet positioned over a front side of the reflective sheet,
   wherein the first and second edges form a perimeter of the reflective sheet,
   wherein the reflective sheet includes:
   a first pattern formed on the second sheet area, the first pattern being positioned between the first edge and the first sheet area, and the first pattern including a plurality of strips elongated along the first edge; and
   a second pattern formed on the second sheet area, the second pattern being positioned between the second edge and the first sheet area, and the second pattern including a plurality of strips elongated along the second edge,
   wherein the plurality of strips of the first pattern includes:
   a first strip that is a continuous line;
   a second strip that is a continuous line and positioned between the first strip and the first edge, the second strip being shorter than the first strip; and
   a third strip that is a continuous line and positioned between the second strip and the first edge, the third strip being shorter than the second strip, and
   wherein the plurality of strips of the second pattern includes:
   a fourth strip that is a continuous line;
   a fifth strip that is a continuous line and positioned between the fourth strip and the second edge, the fifth strip being longer than the fourth strip; and
   a sixth strip that is a continuous line and positioned between the fifth strip and the second edge, the sixth strip being longer than the fifth strip.

2. The backlight unit of claim 1, wherein the first sheet area includes a plurality of lens holes corresponding to positions of the plurality of light sources.

3. The backlight unit of claim 1, wherein at least one of the plurality of strips of the first pattern is different from at least another of the plurality of strips of the first pattern in at least one of a width or a color.

4. The backlight unit of claim 1, wherein a distance between neighboring two strips of the plurality of strips of the first pattern is different from a distance between neighboring two other strips of the plurality of strips of the first pattern.

5. The backlight unit of claim 1, wherein the plurality of strips of the first pattern are formed of a material that is different than that of the reflective sheet and having a different reflectance than that of the reflective sheet.

6. The backlight unit of claim 1, wherein the reflective sheet further includes a dot area.

7. The backlight unit of claim 6, wherein the first sheet area includes a plurality of lens holes corresponding to positions of the plurality of light sources, and
   wherein the dot area is positioned in the second sheet area.

8. The backlight unit of claim 7, wherein the dot area is positioned between an outermost lens hole of the plurality of lens holes and the first pattern.

9. The backlight unit of claim 7, wherein the first sheet area is parallel to the bottom area of the frame and the second sheet area is inclined relative to the bottom area of the frame.

10. The backlight of claim 7, wherein the plurality of lens holes are positioned on the first sheet area at a prescribed interval along the first direction corresponding to the first edge of the reflective sheet and a length of the first pattern is greater than a distance between the plurality of the lens holes.

11. A display device comprising:
    a frame having a recess on a front surface and including a bottom area and a sidewall area that extends from the bottom area;

a substrate positioned over the frame and configured to accommodate a plurality of light sources;

a reflective sheet positioned over a front side of the substrate, the reflective sheet including a first edge and a second edge connected to the first edge, and the reflective sheet being elongated along the first edge, the reflective sheet including:

a first sheet area that contacts the bottom area of the frame; and a second sheet area that extends from the first sheet area and extending away from the bottom area;

an optical sheet positioned over a front side of the reflective sheet; and a display panel positioned over a front side of the optical sheet, wherein the first and second edges form a perimeter of the reflective sheet, wherein the reflective sheet includes:

a first pattern formed on the second sheet area, the first pattern being positioned between the first edge and the first sheet area, the first pattern including a plurality of strips elongated along the first edge; and a second pattern formed on the second sheet area, the second pattern being positioned between the second edge and the first sheet area, the second pattern including a plurality of strips elongated along the second edge, wherein the plurality of strips of the first pattern includes:

a first strip that is a continuous line;

a second strip that is a continuous line and positioned between the first strip and the first edge, the second strip being shorter than the first strip; and a third strip that is a continuous line and positioned between the second strip and the first edge, the third strip being shorter than the second strip, and wherein the plurality of strips of the second pattern includes:

a fourth strip that is a continuous line;

a fifth strip that is a continuous line and positioned between the fourth strip and the second edge, the fifth strip being longer than the fourth strip; and a sixth strip that is a continuous line and positioned between the fifth strip and the second edge, the sixth strip being longer than the fifth strip.

12. The display device of claim 11, wherein the first sheet area includes a plurality of lens holes corresponding to the plurality of light sources.

13. The display device of claim 11, wherein plurality of strips of the second pattern includes:

a first group being positioned adjacent to the first sheet area;

a second group being positioned between the first group and the second edge; and a third group being positioned between the second group and the second edge, and wherein a width of a central portion of the strip of the second group is greater than a width of an end portion of the strip of the second group.

14. The backlight unit of claim 1, wherein the plurality of strips of the second pattern includes:

a first group being positioned adjacent to the first sheet area;

a second group being positioned between the first group and the second edge; and a third group being positioned between the second group and the second edge, wherein a width of a central portion of the strip of the second group is greater than a width of an end portion of the strip of the second group.

15. The backlight unit of claim 1, wherein the first pattern is provided in plural, and the plurality of patterns of the first pattern are arranged in the first direction corresponding to the first edge.

16. The backlight unit of claim 15, wherein the plurality of first patterns are positioned corresponding to the plurality of lens holes.

17. The backlight of claim 1, wherein widths of the plurality of strips of the first pattern becomes wider toward the first edge.

18. The backlight of claim 17, wherein the first strip is darker than the second strip.

19. The backlight of claim 17, wherein a distance between neighboring two strips among the plurality of strips of the first pattern becomes smaller toward the first edge.

* * * * *